US012380323B2

(12) United States Patent
Yudanov

(10) Patent No.: US 12,380,323 B2
(45) Date of Patent: Aug. 5, 2025

(54) PARALLEL PROCESSING IN A SPIKING NEURAL NETWORK

(71) Applicant: Micron Technology, Inc., Boise, ID (US)

(72) Inventor: Dmitri Yudanov, Rancho Cordova, CA (US)

(73) Assignee: Micron Technology, Inc., Boise, ID (US)

(*) Notice: Subject to any disclaimer, the term of this patent is extended or adjusted under 35 U.S.C. 154(b) by 1105 days.

(21) Appl. No.: 17/334,518

(22) Filed: May 28, 2021

(65) Prior Publication Data

US 2022/0383080 A1    Dec. 1, 2022

(51) Int. Cl.
*G06N 3/049* (2023.01)
*G06F 9/30* (2018.01)
*G06F 9/38* (2018.01)
*G06N 3/063* (2023.01)

(52) U.S. Cl.
CPC ......... *G06N 3/063* (2013.01); *G06F 9/30029* (2013.01); *G06F 9/3887* (2013.01); *G06F 9/3889* (2013.01); *G06N 3/049* (2013.01)

(58) Field of Classification Search
CPC ...... G06N 3/063; G06N 3/049; G06F 9/3887; G06F 9/3889
See application file for complete search history.

(56) References Cited

PUBLICATIONS

Furber, S., et al, SpinNaker A Spiking Neural Network Architecture. Retrieved from Internet:<https://library.oapen.org/handle/20.500.12657/47874> (Year: 2020).*
Lu, S., et al, Exploring the Connection Between Binary and Spiking Neural Networks. Retrieved from Internet:<https://www.frontiersin.org/journals/neuroscience/articles/10.3389/fnins.2020.00535/full > (Year: 2020).*
Madrenas, J., et al, Strategies in SIMD Computing for Complex Neural Bioinspired Applications. Retrieved from Internet:<https://ieeexplore.ieee.org/abstract/document/5325429> (Year: 2009)*
Mani, A., et al, Ultra-low Leakage, High Fan-Out Neuro Connection Map with TCAM-based LUT, Localized Priority Encoder and Decoder-less SRAM. Retrieved from Internet:<https://ieeexplore.ieee.org/abstract/document/9180916> (Year: 2020).*

* cited by examiner

*Primary Examiner* — Miranda M Huang
*Assistant Examiner* — Bart I Rylander
(74) *Attorney, Agent, or Firm* — Greenberg Traurig

(57) ABSTRACT

The disclosed embodiments are related to storing critical data in a memory device such as Flash or DRAM memory device. In one embodiment, a device comprising a plurality of parallel processors is disclosed, the plurality of parallel processors configured to: perform a search and match operation, the search and match operation loading a plurality of synaptic identifier bit strings and a plurality of spike identifier bit strings, the search and match operation further generating a plurality of bitmasks; perform a synaptic integration phase, the synaptic integration phase generating a plurality of synaptic current vectors based on the plurality of bitmasks, the synaptic current vectors associated with respective synthetic neurons; solve a neural membrane equation for each of the synthetic neurons; and update membrane potentials associated with the synthetic neurons, the membrane potentials stored in a memory device.

18 Claims, 11 Drawing Sheets

FIG. 7B

PARALLEL PROCESSING IN A SPIKING NEURAL NETWORK

FIELD OF THE TECHNOLOGY

At least some embodiments disclosed herein relate generally to neural networks and, in particular, to spiking neural networks.

BACKGROUND

A spiking neural network (SNN) is a mathematical model of a biological neural network (BNN). A BNN is made up of interconnected neurons that communicate with one another using spikes. A neuron generates a spike on the basis of other spikes that are input into it from connected neurons. Neuron to neuron connections, called synapses, differ in strength. Inbound spikes have different contributions to the generated (i.e., post-synaptic) spike depending on the strength or weight of the respective synapse.

A BNN processes information through the use of spikes traveling from neuron to neuron. A BNN learns by adding new synaptic connections, removing synaptic connections, changing the strength of synaptic connections, or by changing the delay (e.g., conductive properties) in synaptic connections. For example, a person learning how to play a new instrument may change synaptic connections related to motor skills over time.

An SNN mimics a BNN by simulating neurons, synapses, and other elements of BNN, as well as introducing spikes into mathematical neural networks. An SNN may be coded to execute on several processors to simulate spikes transmitted in a neural network. While a fruit fly has about 250,000 neurons and about 80 synapses per neuron, a human brain has about 86 billion neurons and 1,700 synapses per neuron. Thus, scaling an SNN is challenging since the demand for computing resources to quickly process spikes is significant.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, similar reference numbers designate corresponding parts throughout several views.

FIG. 7B is a pipeline diagram illustrating a method for performing spike delivery in a SIMD or MIMD pipeline according to some embodiments of the disclosure.

DETAILED DESCRIPTION

The present disclosure is directed to a processing and memory architecture for implementing an SNN. According to embodiments, the memory architecture uses special-purpose memory devices configured as "nodes." A node represents a group of (e.g., one or more) neurons. Nodes may be coupled together over digital fiber to support a large number of neurons, thereby supporting efficient scalability. The present disclosure is further directed to a SIMD or MIMD pipeline for implementing SNN functionality, including spike delivery, synaptic integration, and neuronal dynamics. Although a SIMD implementation is described, a MIMD pipeline may be used in lieu of a SIMD pipeline.

Figure 1:
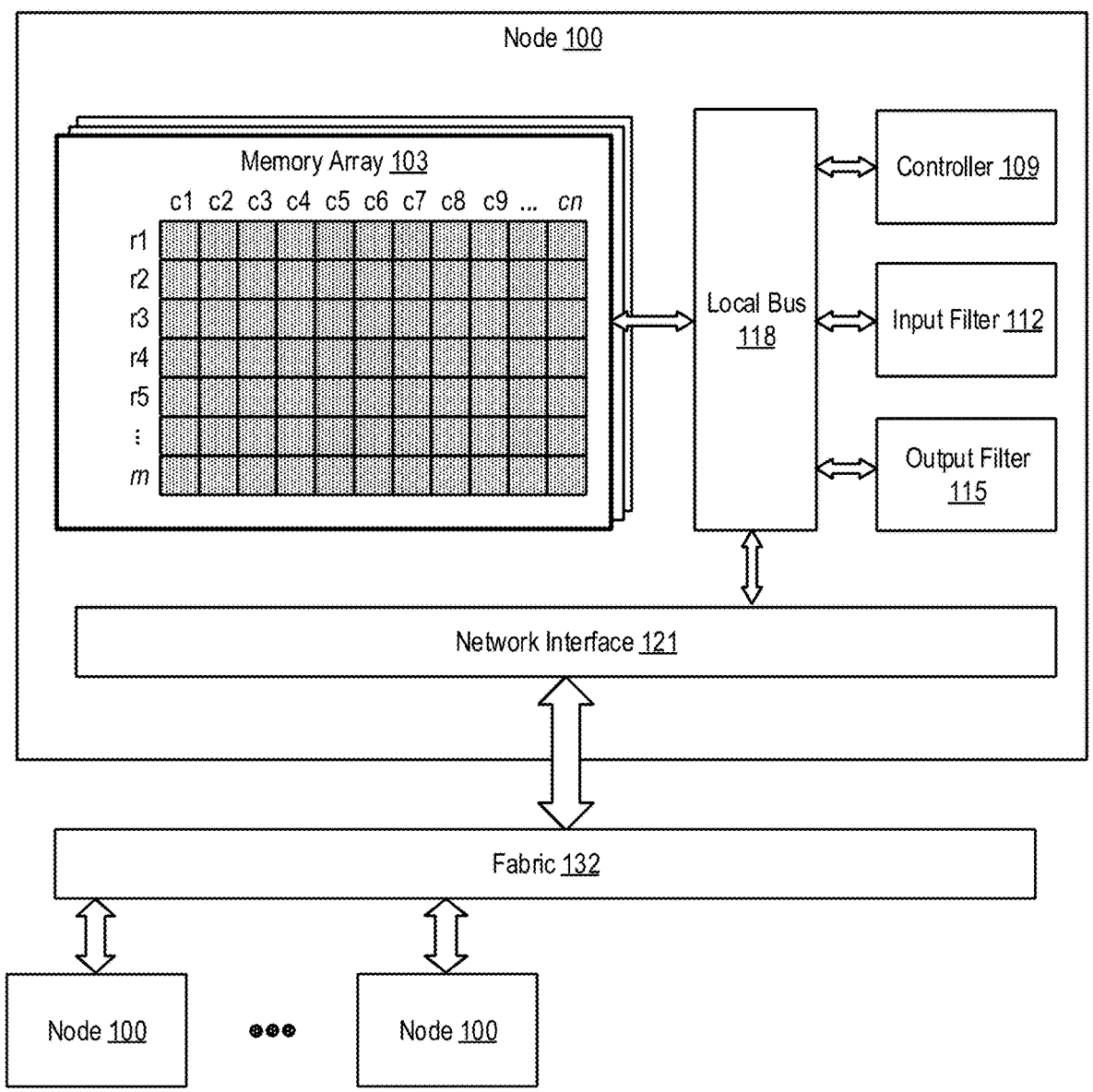
FIG. 1 is an example depicting the architecture of an SNN system according to some embodiments of the disclosure.

FIG. 1 is an example depicting the architecture of an SNN system according to some embodiments of the disclosure.

The SNN architecture is made up of a plurality of nodes 100. In one embodiment, nodes 100 may comprise memory devices that perform in-memory processing (also referred to as processing-in-memory, or PIM) to implement an SNN. For processing in-memory, the SNN architecture provides a scalable system that provides SNN functionality using computer architecture techniques and building nodes 100. A node 100 may comprise a special purpose memory device that is embodied as an integrated circuit (IC). Node 100 may be a semiconductor chip or die or a die stack.

The node 100 may include one or more memory arrays 103. A memory array 103 comprises a plurality of rows and columns and may be defined in terms of a row-column size. The example of FIG. 1 shows a memory array 103 having rows labeled $r_1$ through $r_n$ and columns $c_1$ through $c_n$. At each intersection of a row and column is a memory cell configured to store a value. For example, a data array may contain four sequentially ordered elements A, B, C, and D. The data array may be stored in memory array 103 such that each element of the data array is stored in a corresponding memory cell. For example, element A may be stored in the cell $(r_1, c_1)$, element B may be stored in the cell $(r_1, c_2)$, element C may be stored in the cell $(r_1, c_3)$, and element D may be stored in the cell $(r_1, c_4)$. Thus, in this example, the data array is stored along the first row and occupies the first four columns. This is referred to as a "bit-parallel" configuration. As another example, the data array may be stored along the first column occupying the first four rows. Here, element A may be stored in the cell $(r_1, c_1)$, element B may be stored in the cell ($r_2$, $c_1$), element C may be stored in the cell ($r_3$, $c_1$), and element D may be stored in the cell ($r_4$, $c_1$). This is referred to as a "bit-serial" configuration. Each element (A, B, C, or D) may be a binary digit (e.g., a zero or a one, or a high value and a low value), a discrete value (e.g., a quantized value, a finite number, an integer), or an analog value (e.g., a continuous number, an irrational number). Thus, the memory array 103 is a hardware component used to store data as a plurality of array elements addressable by rows and columns.

In addition to pure bit-parallel and pure bit-serial ways of storing a data array, the data array may also be stored in a hybrid way. Continuing the previous example, elements A and B of the data array can be stored in a first row, and elements C and D can be stored in a second row such that A and C are stored on the first column, but C and D are stored on a second column. Thus, A is aligned with B, row-wise, and C is aligned with D, row-wise. However, A is aligned with C, column-wise, and is B is aligned with D, column-wise. Besides, A and C do not need to be adjoining row-wise, and B and D do not need to be adjoining row-wise. Also, A and C do not need to be adjoining column-wise, and B and D do not need to be adjoining column-wise. Thus, in various embodiments, combinations of bit-serial and bit-parallel arrangements are contemplated.

According to embodiments, node 100 may comprise one or more DRAM arrays to store data digitally. In other embodiments node 100 may comprise Resistive Random Access Memory (ReRAM), 3D Cross Point (3DXP), or other memory devices that implement resistive memory cells or memory cells that can offer to flex or modulate their conductance. Such cells can be diodes, transistors including floating gain and replacement gate transistors, etc. For example, resistive memory cells store data by modulating the resistance of the memory cell according to the data it stores. If a resistive memory cell stores a binary zero ("0"), the resistance may be set to a low value so that the memory cell forms a short circuit (e.g., a resistive short). The memory cell stores a binary one ("1"), the resistance may be set to a high value so that the memory cell forms an open circuit (e.g., a resistive open). The resistance may also be set to be intermediate resistances to store discrete values (e.g., quantized values). The resistance may also be set to be within a range of resistances to store analog values. Memory cells may also include asymmetric elements such as diodes where current passes in one direction but is otherwise impeded in the opposite direction. Other asymmetric elements that may serve as memory cells include, for example, transistors and magnetic tunnel junctions (MTJs).

Node 100 may include a controller 109, an input filter 112, an output filter 115, a local bus 118, a network interface 121, and potentially other integrated components. Controller 109 may be a special-purpose processor that implements logic executed by node 100. The controller 109 may comprise an IC dedicated to storing data in the memory array 103 by organizing the data according to different patterns. The controller 109 may include fast memory elements such as registers, Static Random Access Memory (SRAM) arrays, or caches to store temporal data for quick access.

In some embodiments, controller 109 may be implemented as a separate device that couples to node 100. For example, the controller 109 may be implemented in an Application-Specific Integrated Circuit (ASIC), Field Programmable Gate Array (FPGA), or other special-purpose processors. The controller may thus be part of a host device that couples to node 100. In some embodiments, described in more detail herein, controller 109 may comprise a SIMD, MIMD, or other vector processors.

In addition, controller 109 may receive input data, store the input data, access the input data, read out the data stored in the memory array, perform pattern matching operations to determine if the input data matches a pattern stored in the memory device node, and perform other memory operations (e.g., in-memory operations) to implement a part of an SNN. Controller 109 may include a microcode that controls which word lines and bit lines are activated and in what sequence. Word lines and bit lines are activated by applying a voltage or supplying a current to selected word lines and bit lines. They may be referred to as an activation signal. In some embodiments, controller 109 may adjust the strength of the activation signal by varying the voltage or current depending on the application.

Communication with a node is accomplished using messages called spike messages. A spike message is modeled after the electrical/chemical signal in a BNN. For example, in a BNN, a neuron generates a spike on the basis of other spikes that are input into it from connected neurons. Neuron to neuron connections, called synapses, differ in strength, polarity (excitatory vs. inhibitory), and many other neuro-scientific aspects (e.g., N-Methyl-d-aspartic acid or N-Methyl-d-aspartate (NMDA) type, ion channel, and receptor composition, neurotransmitter orientation, and so on). Thus, inbound spikes have different contributions to the post-synaptic spike depending on their synapse strength (alternatively referred to herein as weight). When modeling the BNN in a computer-implemented SNN, each synapse weight may be dynamically adjusted according to various learning rules. Typically, these rules may consider spike timing as the basis, e.g., if the time of inbound spike was before or after the time of the generated spike.

In a BNN, a spike arriving into a synapse of one neuron (post-synaptic neuron) from another neuron (pre-synaptic neuron) triggers the release of a neurotransmitter in a small gap between the axon and the synapse (called synaptic cleft). The neurotransmitter binds to receptors (or ion channels) of the post-synaptic neuron. These receptors open up a "hole" in the body of the neuron in an explosive-like chain-reaction manner (one receptor triggers opening another), thus resulting in the current influx. A small amount of neurotransmitters is enough to trigger this chain reaction. Thus, the arriving spike is normally approximated as a binary all-or-none event, and the synaptic strength is proportional to the number of these receptors. A node 100 in the SNN architecture of FIG. 1 handles inbound spike messages and generates outbound spike messages, where each spike message participates in simulating the electrical and chemical signaling between neurons in a BNN.

Each node 100 is modeled to represent a cluster of neurons. Terms such as "neuron," "spike," or "synapse" refer to the biological components in a BNN as well as the computer-implemented components that are modeled after their respective biological components. A single node 100 may receive spike messages directed to one or more neurons within a cluster represented by the single node 100. The SNN architecture may use neuron identifiers to address specific neurons included in node 100. In addition, the SNN architecture may store synaptic connection IDs to represent a synaptic connection between two neurons. Because a neuron may be synaptically connected to several other neurons, there will be more (usually significantly more) unique synaptic connection identifiers than neuron identifiers.

A node 100 may generate outbound spike messages by the neurons contained within node 100. Node 100 may include an input filter 112 for processing inbound spike messages and an output filter 115 for processing outbound spike messages.

By including an input filter 112 for a given node 100, node 100 can filter in the inbound spike messages directed to target neurons inside node 100. The output filter 115 can filter out generated spike messages that have target neurons in other nodes 100. Spike messages generated within node 100 only for neurons within node 100 may remain inside node 100. The transmission of spike messages among a plurality of nodes 100 may appear like a selective broadcast operation or multicast operation that targets a range of neurons and via their synapses across one or more nodes 100. Neurons may be addressed (e.g., targeted) by a spike message using a synaptic connection identifier that associates a source neuron ID to a target neuron or synapse IDs.

The filter function of the input filter 112 or output filter 115 may involve a match operation performed on a subset of synaptic connections addressable by a synaptic connection identifier (ID) that links a source neuron to a target neuron via a specific synapse. Such a synaptic connection identifier can be or otherwise include a source neuron ID. The source neuron ID may be part of a spike message descriptor. An addressing scheme with predetermined algorithmic allocation may be used to accelerate the filter operation performed by the input filter 112 or output filter 115. For example, neurons may be allocated such that the node identifier of the node 100 matches a subset of bits in the source neuron IDs. In a hybrid identification method, a combination of an input filter 112 (or output filter 115) and an addressing scheme can be used as well. In some embodiments, the input filter 112 (or output filter 115) includes a lookup table comprising the neuron IDs of a particular node 100. The input 112 and output 115 filters may be configured to perform matching operations to match the source neuron ID of an inbound spike message to the target synapse of a target neuron within node 100, where the target neurons are linked to the source neuron via a synaptic connection. An example of pattern matching using resistive-like or diode-like memory arrays is described in patent application Ser. No. 16/902,685 titled "Matching Patterns in Memory Arrays," which is incorporated by reference in its entirety. Synaptic connection IDs may be stored as patterns in a memory array 103. For example, the synaptic connection ID may be stored along a particular bit line (or word line) of the memory array 103. The source neuron ID of a spike message may be matched against the memory array 103 to determine if the synaptic connection ID is present in the memory array 103. The bit line (or word line) may correspond to a key-value pair that links to a portion of the memory array 103 that contains additional information pertaining to the synaptic connection, including the connection strength, weight, precise delay value, last time the connection was a subject to a spike and other data. To this end, a bit line in the memory array, at least in part, may correspond to a synaptic connection that is matched to a source neuron ID. The bit line may map to another memory section that stores synaptic connection parameters for the matching synaptic connection.

The components of a node 100 may be coupled via a local bus 118. The local bus 118 may provide access to the memory 103 for routing commands related to processing spike messages. The node 100 may also include a network interface 121. The network interface 121 may provide data and/or control signals between node 100 and other nodes 100 or external systems. Thus, the network interface 121 may couple the node 100 to fabric 132.

The fabric 132 may deliver generated spike messages, so they may be consumed by all targeted nodes 100. When modeling the SNN after a BNN, the delivery time depends on the delay, which is unique for each axon, but within a range of one millisecond to 100 milliseconds. A real neuron may have a delay that depends on the length of its axonal tree trunk common to all axonal branches and specific from that common point to the synapse. In some embodiments of the SNN architecture, a spike message may include descriptors such as, for example, a neuron ID, time, a delay, and potentially a spike strength.

The fabric 132 may need to achieve a minimum bandwidth to support all connected nodes 100. The bandwidth requirements to allow for node interconnectivity may be reduced using an intelligent allocation of neurons and synapse placement. Synapses may be placed by neighboring with their connections to each other entirely within a node 100. This may reduce outbound spike message traffic. Normally, biological neurons have more local connections than remote ones. Thus, neural net connectomes naturally support this allocation. The allocation also could have a reduction gradient in connectivity with neighboring nodes 100 as they become more distant. As a result, another technique is a selective broadcast or multicast where most of the spike traffic is localized within neighboring nodes 100 with descent in connectivity gradient for more remote nodes 100. Additional filters (e.g., input filters 112 or output filters 115) can be placed along fabric 132 to support selective broadcast, such that the filters can permit spike messages with certain neuron IDs into respective sections of fabric 132. This can reduce redundant traffic.

The following figures illustrate some embodiments of handling inbound spike messages through a pipeline architecture within the SNN system described above in FIG. 1. For example, the input filter 112 of a node 100 receives spike messages. The node stores various synaptic connections (referenced by synaptic connection IDs). A synaptic connection stores a connection between two neurons (each of which is referenced by respective neuron IDs). In addition, node 100 may store parameters (e.g., weights) about each synaptic connection. These parameters may dictate how spike messages are communicated from neuron to neuron. The pipeline architecture supports the ability to perform a mathematical operation using relevant synaptic connection parameters in parallel with performing search operations to match a spike message to a target neuron.

Figure 2:
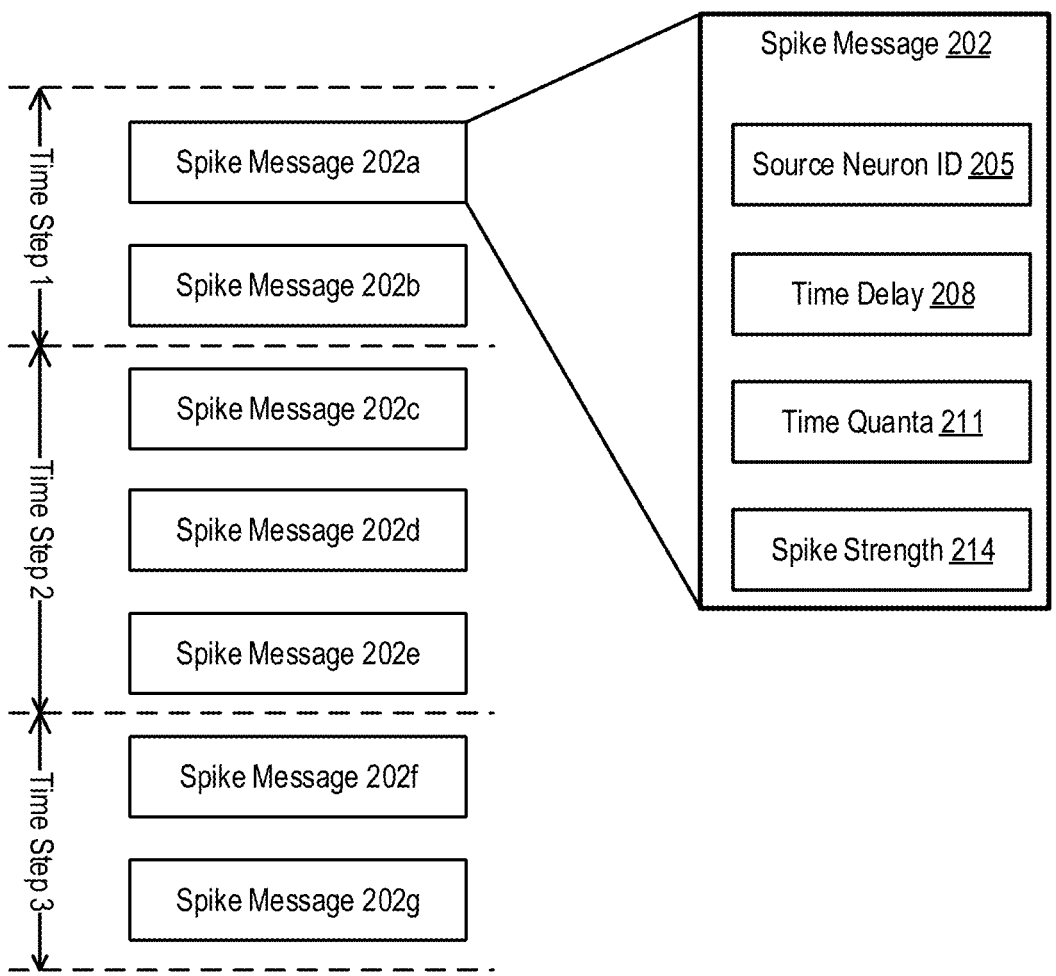
FIG. 2 is a block diagram illustrating spike messages communicated within the SNN system according to some embodiments of the disclosure.

FIG. 2 is a block diagram illustrating spike messages communicated within the SNN system according to some embodiments of the disclosure.

The SNN architecture may time slice the flow of spike messages into sequential steps. That is, the communication of a spike message occurs in a given time slice (e.g., a time interval or time step). This quantizes the transmission of spike messages into various sequential time steps. In FIG. 2, three sequential time steps are shown. Each time step may span one (1) millisecond. In this embodiment, a first time step spans the first millisecond; the second time step spans the second millisecond; the third time step spans the third millisecond; etc.

In the first time step, the input filter 112 of a node 100 may receive a finite number of spike messages, including a first spike message 202a and a second spike message 202b. In the second time step, the input filter 112 may receive additional spike messages, including a third spike message 202c, a fourth spike message 202d, and a fifth spike message 202e.

In the third time step, the input filter 112 may continue to receive additional spike messages, including a sixth spike message 202f and a seventh spike message 202g. Each spike message 202a through 202g may conform to a predefined spike message format 202. The predefined spike message format 202 may include a set of spike descriptors 205, 208, 211, 214. The spike descriptors may include a source neuron ID 205, a time delay 208, a time quanta 211, a spike strength 214, and potentially other information.

In some embodiments, the source neuron identifier 205 may have a size of 37 bits. The bit length of the source neuron identifier 205 may depend on the number of neurons in the SNN system. For example, 37 bits may be sufficient to address all neurons in an SNN that is the size of a human brain (e.g., 86 billion neurons). The time quanta 211 may identify the quantized time step that the spike message was generated. For example, the first spike message 202a and second spike message 202b may have the same value for the time quanta 211. The third, fourth, and fifth spike messages (202c through 202e) may have the same value for the time quanta 211, a value that is incremented by one from the previous time step. In some embodiments, the time quanta may have a size of seven (7) bits to cover the range of one (1) millisecond to 100 milliseconds. The range may be bounded by the longest time it takes to transmit a spike in a BNN. In some cases, time quanta 211 can be omitted in a message if all messages are delivered within minimum delay time from the time when they are generated. The time delay 208 may reflect the delay properties of the spike message. In a BNN, the time delay is a function of the physical properties of at least the source neuron and axon. The seven (7) bits may be sufficient to cover a range of one (1) millisecond to 100 milliseconds for time-delay information. In some embodiments, the value of the time delay 208 may be stored with the synaptic connection. In some embodiments, the spike strength 214 may comprise an integer value representing the continuous strength of the spike. In some embodiments, spikes have identical strengths (e.g., binary strengths), and thus the spike strength 214 may be omitted. In some embodiments, various data may be encoded in the spike strength, such as spike polarity and magnitude.

Figure 3:
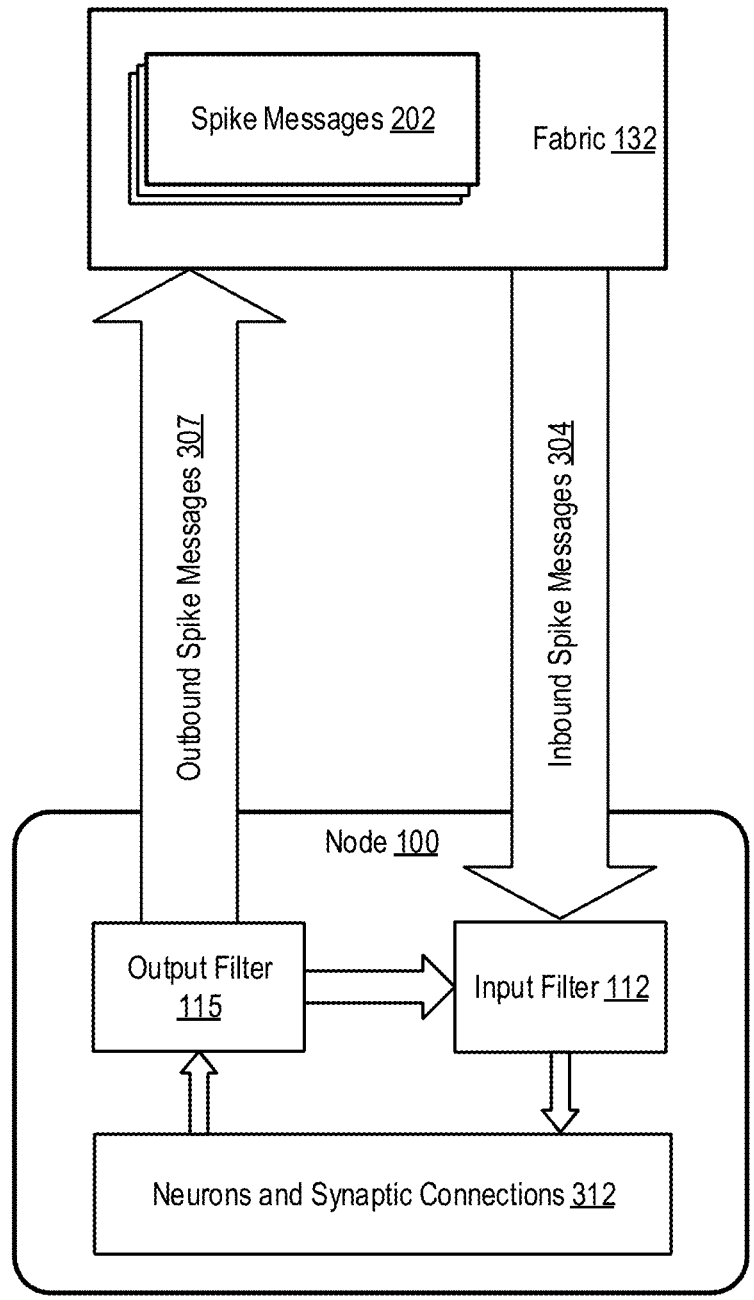
FIG. 3 is a block diagram illustrating a node coupled to fabric within the SNN system according to some embodiments of the disclosure.

FIG. 3 is a block diagram illustrating a node coupled to fabric within the SNN system according to some embodiments of the disclosure.

The embodiment of FIG. 3 provides a high-level overview of the flow of spike messages to and from a node such as node 100. As mentioned above, node 100 represents a cluster of neurons that are referenced by neuron IDs. In addition, each synapse of a neuron in node 100 is connected to a source neuron, where the connection is referenced by a synaptic connection ID. Spike messages 202 may, at some point, travel from fabric 132 to a particular node 100. The spike messages 202 are referred to as inbound spike messages 304. Node 100 includes an input filter 112 that is configured to determine which of the inbound spike messages 304 are directed to the neurons of node 100. For example, it may be the case that none of the inbound spike messages 304 are targeting neurons in node 100.

The input filter 112 is configured to perform a match operation to select a subset (e.g., all, some, or none) of the inbound spike messages 304 based on whether they target a neuron in node 100. The input filter 112 may, therefore, reduce the workload performed by node 100 by identifying a subset of inbound spike messages 304 relevant to node 100. Match operations can be at least partly based on matching a source neuron ID from a spike message with a range of synaptic IDs stored in a node 100. Such ranges can be represented by bit patterns or sequences.

After filtering the inbound spike messages 304, node 100 performs two primary operations. One primary operation is generating outbound spike messages 307 based on the neurons and synaptic connections 312 of the node 100. The other primary operation is changing the properties of the neurons and synaptic connections 312. The neurons and synaptic connections 312 are digital, mixed-signal, or analog representations of the neurons and synaptic connections in a BNN. The neurons and synaptic connections 312 may have various parameters and weights that model and define the intrinsic properties of the neurons and synaptic connections 312. In this respect, the parameters of the neuron or synaptic connections 312 represent the state of the neuron or synaptic connection. One parameter that may define the neuron's state may include the neuron's cell membrane potential. One parameter that may define the synaptic connection's state is a synaptic strength (weight) value that models the resistance or conductance of the synaptic connection. Another parameter that may define the synaptic connection's state 312 is a delay value. There are many other parameters possible to include in a similar manner. The implementation may depend on the synaptic and neuronal models chosen for the SNN.

BNNs process information and provide "intelligence" by the way neurons fire and synapses change their properties. A biological input (e.g., a sensory signal) initiates the triggering of spikes through the BNN. Different groups of neurons are activated in a particular sequence and at a particular timing to eventually activate some biological output (e.g., a hand muscle). A BNN learns by rewiring or restructuring neural connections by adding new neural connections, removing old neural connections, increasing the resistance between neural connections, introducing delay, or decreasing resistance, reducing delay. This is referred to as "synaptic plasticity," in which the changing of the way neurons are connected in response to repeated spiking or lack of spiking. Thus, the SNN continues to relay spikes to process inputs and generate outputs while contemporaneously rewiring itself to learn. Similarly, an SNN architecture maintains information that defines neurons and synaptic connections 312. This information is used to generate outbound spike messages 307 while also being dynamically updated to "learn."

To elaborate further, the main principle of SNN learning rules is that "neurons that fire together wire together," which is referred to as Hebbian learning. One such rule depends on spike timing, which is the time of an incoming neuron spike relative to a generated by the neuron spike. This is mathematically modeled as Spike-Time-Dependent Plasticity (STDP). STDP is a feature of biological neurons to adjust their synapses according to pre- and post-spike timing. For the pre-synaptic spikes that arrived before their post-synaptic (i.e., target) neuron made a spike, their synapses are potentiated. For the pre-synaptic spikes that arrived after their post-synaptic neuron made a spike, their synapses are depressed. The magnitude of synapse conductance change (potentiation or depression, i.e., up or down) is determined by exponential-like curves. One curve is Long-Time Potentiation (LTP), which determines the magnitude of synapse conductance change for synapses receiving spikes before the target neuron generates a spike. Another curve is Long-Time Depression (LTD), which determines the magnitude of synapse conductance change for synapses receiving spikes after the target neuron generates a spike. STDP rules allow an SNN to continuously "error-correct" each synapse locally.

In a computer memory-implemented system of an SNN, handling STDP may involve storing pre-synaptic spikes for the time length of the LTP window, and then, once a post-synaptic neuron generates a spike, "replay" these events and adjust synaptic conductance values accordingly. Another way is to implement the "eligibility window" feature at the memory cell level or memory architecture level. SNN structural plasticity can be implemented by adding low-efficacy synaptic connections as determined by plasticity rules and letting them evolve by applying STDP calculations or by eliminating synaptic connections that decayed their value to very high resistance (low efficacy).

As the neurons and synaptic connections 312 change over time via STDP rules, neurons, and their synaptic connections 312, generate outbound spike messages 307. An output filter 115 may determine how to route the outbound spike messages 307. For example, the output filter 115 may broadcast or multicast the outbound spike messages to other nodes 100 over fabric 132. The output filter 115 may also determine that some of the outbound spike messages 307 are targeting neurons within the same node 100.

Figure 4:
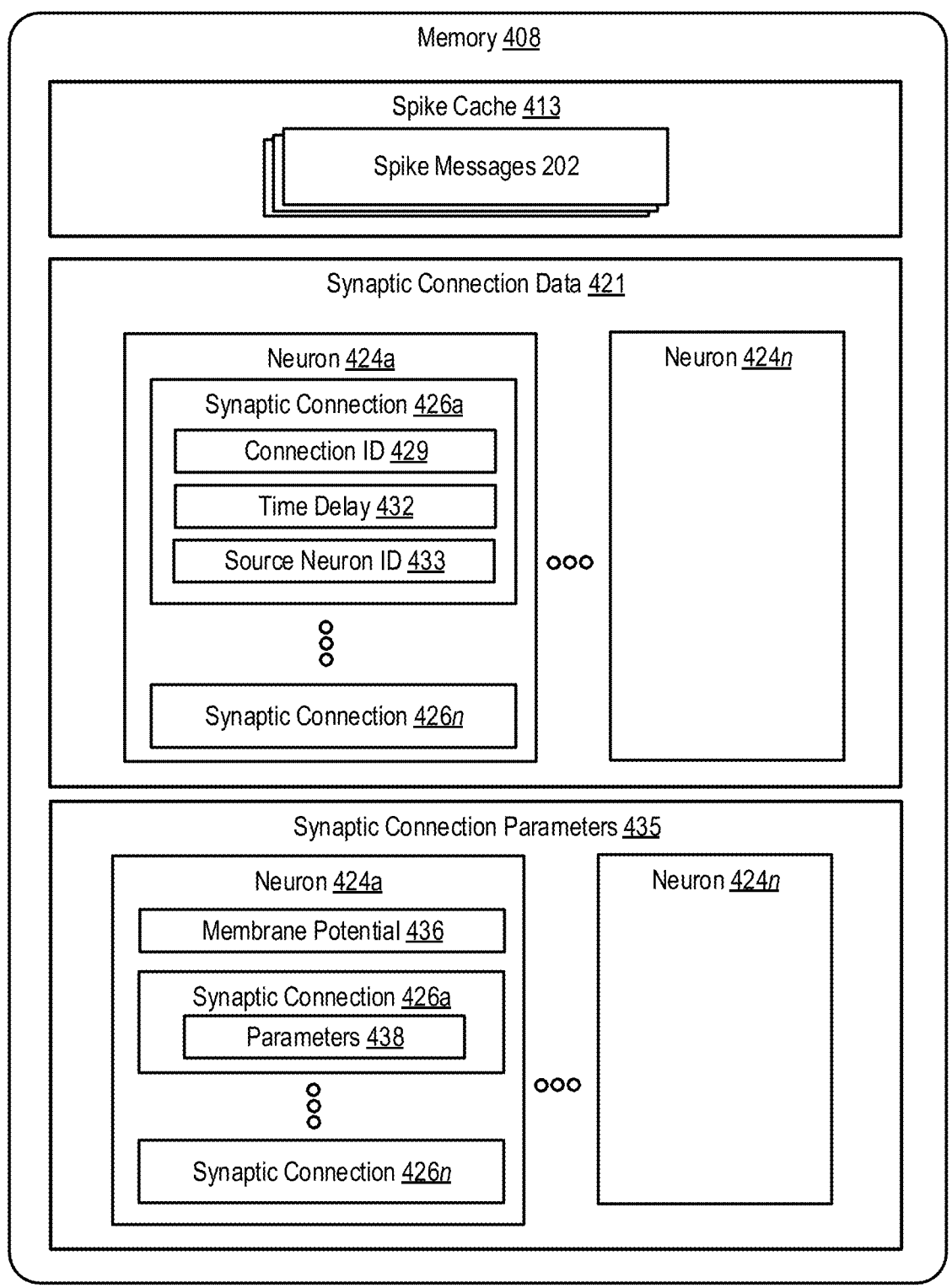
FIG. 4 is a block diagram illustrating a memory of a node within the SNN system according to some embodiments of the disclosure.

FIG. 4 is a block diagram illustrating a memory of a node within the SNN system according to some embodiments of the disclosure.

The illustrated embodiment provides an example of a memory structure for storing information related to neurons and synaptic connections 312, storing, queuing, and prioritizing inbound spike messages 304 and outbound spike messages 307, and managing the storage of other data related to SNN operations. The illustrated memory structure provides an example of organizing information to allow for the pipeline processing of spike messages 202 handled by a node 100.

As illustrated, a given node 100 includes a memory 408. The memory 408 may include one or more memory arrays 103 or other collections of memory cells. The memory 408 may be divided into multiple sections such as, for example, a spike cache 413 (e.g., a first memory section), a section for storing synaptic connection data 421 (e.g., a second memory section), and a section for storing synaptic connection and neuronal parameters 435 (e.g., a third memory section). Each memory section may be defined by one or more memory array identifiers that identify specific memory arrays 103, a row (or word line) range(s), a column (or bit line) range(s), one or more deck identifiers that identify decks (e.g., layers in 3D memory devices), or other groupings of memory cells.

The first memory section may be reserved for a spike cache 413. The spike cache is configured to store spike messages 202 in a predefined number of spike groups. For example, the spike cache 413 may store all inbound spike messages 304 that are filtered in by the input filter 112. In other words, the spike messages 202 are filtered such that they involve neurons within a node 100. Spike messages 202 that are not targeting neurons in node 100 are not stored in the spike cache 413.

In some embodiments, each spike message 202 is assigned to a corresponding spike group according to a value of time delay 208 contained in the spike message 202 or, in a simple case, to a group with the most recently arrived spikes. A spike group may be a "bucket" having a corresponding label or identifier. The use of spike groups allows for the prioritization of spike messages having less delay over spikes having a greater delay, as well as for continuous motion of spikes in time.

Additionally, for a particular time step, a set of spikes passes through the input filter 112 and is stored in a spike group within the spike cache 413. The spike group may have an identifier (e.g., label "0"), indicating that it is the group of the most recent spikes. The labels for subsequent groups are incremented by one. There may be as many spike groups as there are time steps in the maximum possible delay. For example, given the maximum delay of 100 milliseconds and time step one (1) millisecond, there are 100 spike groups and associated labels. These spike groups make up the spike cache 413 with temporal locality and a schedule associated with processing spikes according to this locality. In some embodiments, spike messages do not need to remain stored for the entire duration until they become associated with the largest delay bucket (e.g., 100 milliseconds). Rather, they can be removed (invalidated) from the cache as soon as their longest delay is processed. Thus, this helps to keep the cache utilization efficient.

In some embodiments, the spike cache 413 includes a small table that can store a "label <=> pointer" to its spike group stored in memory's association. The label that is incremented to label "100" eventually circles back to label "0." Old spikes can be discarded or overwritten by newly arriving spikes. This incrementation functionality can be achieved by incrementing a single rotating counter (e.g., an increment operation and modulo operation). The counter identifies the label with the most recent spike group to which newly filtered spikes can be placed in the current time step. Alternatively, spikes can be placed in relevant buckets according to the delay information in the spike messages. Spike groups may be described as opaque memory allocations that store spike message descriptors; however, physically, they may be not opaque but distributed.

The second section of memory may be reserved for synaptic connection data 421. For example, the second section of memory is configured to store data indicating a plurality of synaptic connections, where each synaptic connection references a set of neuron identifiers. The second section of memory may be organized by neurons (424a through 424n). For example, the illustrated embodiment shows storing data for a first neuron 424a through the last neuron 424n of node 100. For each neuron (424a through 424n), the second section of memory stores a set of synaptic connections (426a through 426n). Each synaptic connection (426a through 426n) may include data comprising a synaptic connection ID 429, a time delay 432, and/or a source neuron ID 433 (e.g., the pre-synaptic neuron ID). In some embodiments, this synaptic connection ID is the same as the source neuron ID or otherwise includes the source neuron ID, thus eliminating the necessity to store both. A synaptic connection in a BNN involves the axon of a source neuron connecting to the dendrites of one or more target neurons. Thus, the synaptic connections (426a through 426n) for a given neuron (424a through 424n) are accessible and identifiable using a synaptic connection ID 429. Further, each synaptic connection (426a through 426n) specifies the source neuron ID 433 of the transmitting neuron. In some embodiments, the synaptic connection ID is the same as the source neuron ID and hence not needed. The time delay 432 or other parameters may define the characteristics of the synaptic connection. In some embodiments, the time delay 432 stored in node 100 has a precise value, while the spike message 202 includes a time delay 208 having a coarse value. In some embodiments, the aforementioned variables can be stored in different sections of a memory array or in different memory arrays at corresponding to delay value relevant positions.

Each neuron (424a through 424n) has pre-synaptic (incoming or source) connections (426a through 426n). These connections may be grouped or ordered by delay value. In a BNN, the spike is communicated across the synaptic connection (426a through 426n). The spike experiences a delay, where the delay is how the BNN, at least in part, encodes information. In other words, the timing of firing neurons is how information is processed in a BNN. In the SNN architecture, the delay is modeled using one or more delay values. The spike message 202 may include a time delay 208 that is a coarse value. The synaptic connection (426a through 426n) may store a time delay 432 having a precise value. Taking together, the sum of the coarse value and precise value of the time delays 208, 432 represents the overall delay for a particular synaptic connection (426a through 426n).

The coarse time delay 208 may have some range (e.g., between one millisecond and 100 milliseconds. The coarse time delay 208 is quantized in increments of time steps. If high delay precision is required, then this coarse delay value can be made more precise by adding the precise time delay 432 (e.g., a floating-point value between zero and one, signifying precise delay within a time step). The precise time delay 432 provides an addition to quantized delay and may be used in some embodiments to improve accuracy. Depending on the embodiment, a precise time delay to be added to a coarse time delay may involve a floating-point or integer or some other custom format.

Synaptic connections (426a through 426n) of each neuron (424a through 424n) may also be organized and processed in buckets in increments of a time-step (e.g., one millisecond) according to the coarse delay value.

The memory 408 of node 100 may also include a third memory section reserved for storing neuronal and synaptic connection parameters 435 for each synaptic connection associated with a particular neuron. For example, the third memory section may organize the data by neurons (424a through 424n). Data that models each neuron (424a through 424n) is stored in this section of memory. This may include a membrane potential 436 and other parameters 438 of each neuron. These parameters may include all synaptic connections associated with a neuron, such as the synaptic connection (426a through 426n). The membrane potential in a BNN is an intrinsic property of the neuron the defines the neuron's state. The membrane potential changes over time, based on current dynamics across the membrane, at least in part, due to received spikes. In other words, the strength of spikes received by the neuron and the frequency that spikes are received change the neuron's membrane potential over time. In an SNN, the membrane potential 436 is recorded as a value stored in memory for each neuron (424a through 424n). The membrane potential 436 may be continuously updated in response to a particular neuron receiving a spike message 202. Besides membrane potential other neuronal variables that define neuronal state may be stored. Those variables may include various ionic currents, permeability states, the concentration of certain chemicals, and so on.

Other parameters 438 include the weight values of each synaptic connection (426a through 426n) associated with a particular neuron (424a through 424n). When stored in memory, synaptic connections may be grouped by neuron with which the synaptic connections are associated. A synaptic connection may be modeled having a particular weight. Weight combinations of multiple synaptic connections lead to the training and learning of an SNN. The weights change over time as a result of STDP. STDP turns a neuron to serve as a selector device. A neuron evolves to exhibit a particular weight combination across its synaptic connections. Quantifying the connectivity using weights allows the SNN to generate outbound spike messages.

The Synaptic Connection Parameters 435 are used to perform a current integration operation for calculating how a neuron's (424a through 424n) properties change over time (e.g., the neuron's membrane potential, 436) and for determining the outbound spike message 307 generated by each neuron (424a through 424n) that spikes.

The organization of the node's memory 408 shown in FIG. 4 allows for inbound spike messages to be queued in a spike cache 413. Synaptic connections may be searched for based on the source neuron ID 205 contained in each spike message 202. Such a search may be performed within each delay bucket or group by which the spikes are stored in the cache. This may involve performing in-memory pattern searching techniques for matching the source neuron ID 205 in the spike message 202 to source neuron ID 205 in the synaptic connection data 421 of a second memory section. As part of the pipeline architecture, in response to matches being found in the second memory section, the targeted neurons (424a through 424n) and/or synaptic connections (426a through 426n) that have yielded matches may then be identified and may point to the neurons (424a through 424n) or synaptic connections (426a through 426n) of a third memory section. Current integration, neuronal integration, STDP operations, and other neuromorphic features may be performed using synaptic connection parameters 435 stored in the third memory section.

In some embodiments, spike messages are not stored in delay buckets. For example, at each time step, a node admits filtered spike messages. These spike messages are matched against synaptic IDs of all neurons in the node. Synaptic IDs can be pre-sorted, and this speeds up the matching process. A spike ID may immediately indicate the location (e.g., index) of all target synapses and relevant neurons. Each synapse may include a counter that is instantiated with a delay value (or zero). The clock for each counter is decremented (or incremented) until it ends, reaching zero or some other predetermine delay value.

The ending of a counter means that the spike message arrived at its synapse. This search and match process may be pipelined into synaptic and neuronal computations, which result in new spikes sent to the network.

One way to implement this is by using a self-counting cache made up of spike IDs and one or more associated self-decrementing counters, each counter having a signal line. The signal lines may be dual signal lines. For example, the signal line may have horizontal and vertical signal lines, where the intersection of which within a grid of counters signifies which counter is due. Such signal lines may be pull-up or pull-down lines.

Figure 5:
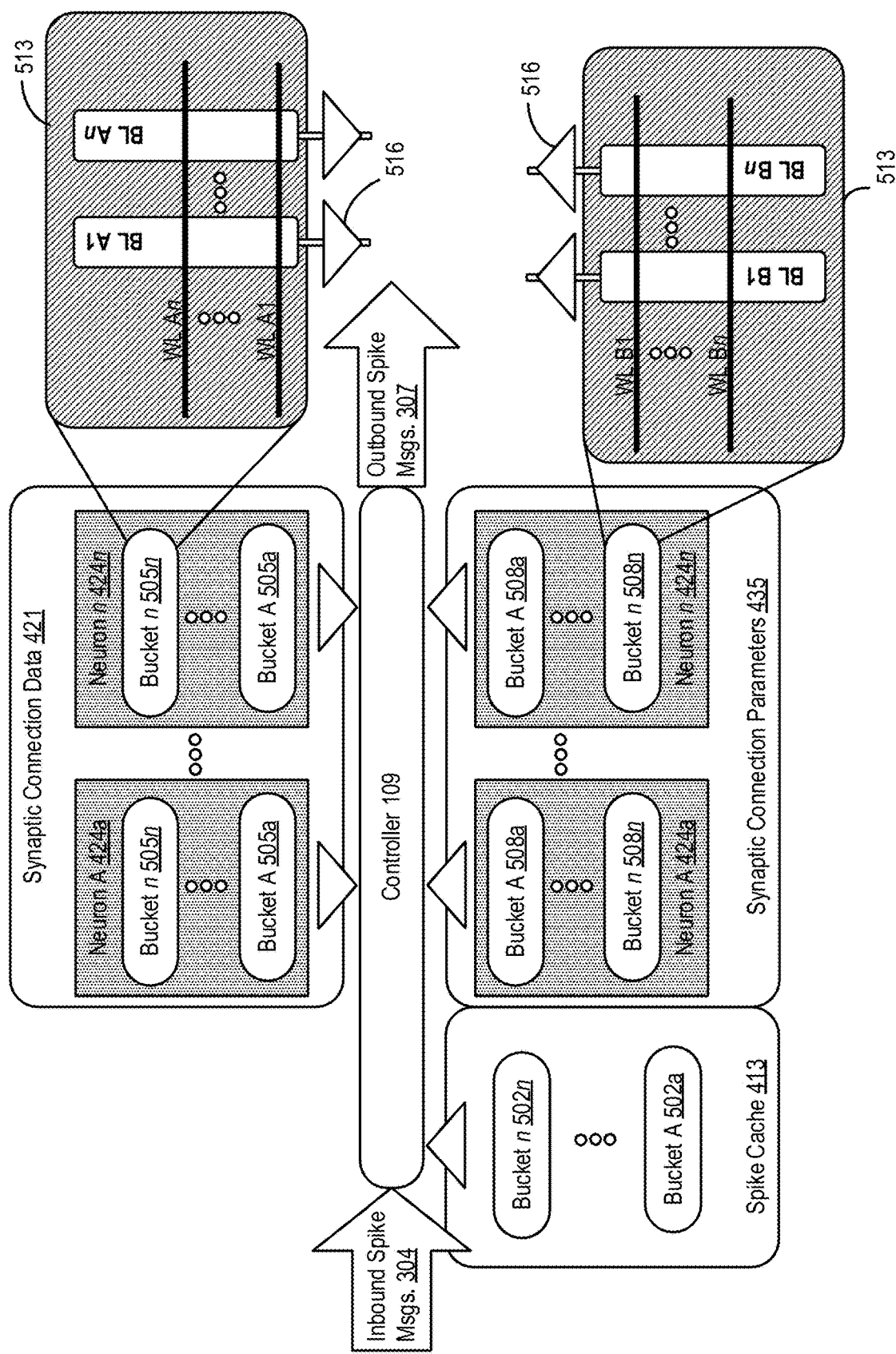
FIG. 5 is a block diagram illustrating the functionality and structure of a node within the SNN system according to some embodiments of the disclosure.

FIG. 5 is a block diagram illustrating the functionality and structure of a node within the SNN system according to some embodiments of the disclosure.

The illustrated embodiment builds upon the memory structure of FIG. 4 and illustrates the pipeline architecture of performing searches and calculations of synaptic connections in parallel. The illustrated embodiment shows the spike cache 413 organized by a predefined number of buckets (502a through 502n). Each bucket, be it logical or physical, corresponds to a different time step in which inbound spike messages 304 are received. A controller 109 may receive inbound spike messages 304. An input filter 112 may allow only the relevant spike messages that target neurons 424 within node 100. Along with filtering, other operations may be performed by the input filter 112. Such operations include, for example, the determination of synapses and neurons which are targeted by the spikes, the placement of spikes into hardware queues or directly into spike cache, the handing of spikes to the controller, etc. Controller 109 may store the inbound spike message 304 in a corresponding bucket 502 based on the value of the time delay 208 in the inbound spike message 304, or in a simple case in a bucket "1" (minimum delay bucket). Thus, inbound spike messages 304 are grouped together by sequentially ordered buckets 502 based on a quantized time delay. The spike messages of bucket 502 are processed together before moving onto the spike messages of the next bucket 502.

Similarly, synaptic connection data 421 are organized by a predetermined number of buckets (505a through 505n), and the synaptic connection parameters 435 may also be organized by a predetermined number of buckets (508a through 505n). Each bucket 505, 508 may include a set of memory cells 513 within the memory array (e.g., defined by a row/column range), where the memory cells 513 are coupled to a sense amplifier 516.

There may be the same number of buckets 502, 505, 508 for the spike cache 413, the synaptic connection data 421, and the synaptic connection parameters 435. For example, there may be 100 buckets ranging from bucket 1 to bucket 100. There may also be a circular bucket counter that increments at each time step from 1 to 100 and then circles back to 1. For example, at clock cycle i, controller 109 processes the buckets 502i, 505i, 508i−1 in the relevant memory section. Specifically, buckets 502i and 505i are involved in search and match operation (matching spike IDs in a bucket i from spike cache with synaptic IDs in Synaptic Connection Data 421). The outcome of this operation is the determination of which synaptic connections are matched with which spike messages. This data is used in the next clock cycle with bucket 508i. Also, in the clock cycle i the controller 109 processes the bucket 508i−1 for synaptic connections determined as matched in the previous cycle when performing search and match on buckets 502i−1 and 505i−1. Processing bucket 508i−1 may involve current integration, neuronal integration, STDP operations, and other neuromorphic features. In the next clock cycle, the bucket counter is incremented to bucket i+1, and controller 109 processes the second buckets 502i+1, 505i+1, 508i+1 in each memory section. The processing is the same as in clock cycle i. This process repeats for all delay buckets. For example, if there are 100 delay buckets, then there are 100 clock cycles for a single time step (e.g., clock cycle i). As a result of this pipelined process, a search and match operation occurs in parallel with neuromorphic operations. Each time step involves processing all delay buckets, but the main difference between consecutive time steps is that delay buckets rotate by 1 position, and they are searched/matched against different synaptic connection buckets. The usage of the term "clock cycle" may be replaced with a 'step' or the like. The clock cycle or step for this processing by delay bucket may be local and separate from the time step applied to synchronize global operations of the complete SNN system.

Many synaptic events (e.g., newly generated spike messages) are generated at each time step upon detection of a match of a spike ID with synaptic ID for synapses of each neuron 424 from various time step buckets. In this respect, all neurons and all buckets per neuron can be processed concurrently in a pipeline architecture. This involves first performing a search/match operation to locate synaptic connections 426. For each successful match, the next immediate step is to integrate a post-synaptic current related to that match. In a SNN, post-synaptic currents are generated due to local openings in the cell membrane, and they may be integrated for all successful matches per neuron. The integration process can consider the distance of synapse to neuron soma (requires more complex integration scheme), or it can omit this complexity, which essentially reduces it to simple current summation, the currents generated according to synaptic efficacies triggered by spikes. In the SNN architecture, current integration operations are performed by accessing the memory section containing the synaptic connection parameters 435, while the search/match operation is performed on the memory section containing the synaptic connection data 421. Many optimizations are possible for allocation by buckets. This may include, for example, sorting neurons by the commonality of connections and storing them in memory, thereby allocating neurons to nodes. Another optimization is injecting spike messages in the delay bucket according to their minimum delay and discarding spike messages from delay buckets according to their maximum delay. Thus, unnecessary match operations are reduced. This would require adding minimum delay info to the spike message descriptor. Another optimization is sorting spike messages in each spike bucket according to spike neuron IDs and sorting synapses in each synaptic bucket. This may limit the processing range to only a subset of spike IDs.

Spike IDs are one common dependency that can be exploited for match operations. For example, a spike ID can be mapped to a set of word lines (WLs) that drive a memory array section, and each bit line (BL) may respond with a match/mismatch signal. Another dimension to parallelize is delay buckets. For example, each delay bucket can be stored in a different memory array and can perform match operations in parallel with other buckets. Neuronal parallelism is another dimension. In this example, neurons can be distributed among many subarrays. Alternatively, matching can be done in a more serial way, e.g., down to 1 bucket at a time in a single array, as long as all buckets are done a long time before the real-time step (e.g., 1 ms) expires so to assure Quality of Service (QoS). Many pipelined and multiplexed variants of this methodology are possible.

In some cases, the match is implied by the network topology and can be avoided. For SNN sections with regular connections, such as performing convolutional operations, the network topology fits well within a memory array. The search and match operation may be the same for many neurons. Cortical columns have similar but less structured topology. For other SNN sections, synaptic connections may differ largely from neuron to neuron.

In some embodiments, both match and current summation in place in a memory array, such that match operation, is fused with current integration (e.g., a match operation gates current integration locally to each memory cell (or a group of cells)). This may involve forming conditional memory such that it provides access to the content of a second cell group upon detecting a pattern match on the content of the first group. The access is provided in place (without going via sense amps). As a result, multiple patterns could be streamed into multiple groups of WLs of a device like this, and BLs would generate the computation results in place. The potential of such memory would be broad and may include cryptography, content-addressable memory, in-memory logic, graph operations, or other networks beyond SNN. One potential way to achieve this may be a double-decker configuration, where the first deck would store keys and the second deck would store values accessible conditionally upon matching the keys. Another way is a NAND string gating a WL of NOR row containing synapses of all neurons that have synaptic ID stored in a NAND memory device. Yet another way is a NAND string gating another section of a NAND string containing synaptic information.

The performance of such memory may depend mostly on the number of incoming spike messages per delay bucket. For example, with an average of 100 spike messages per delay bucket in a node 100, the system may need 100 clocks per time step.

Figure 6:
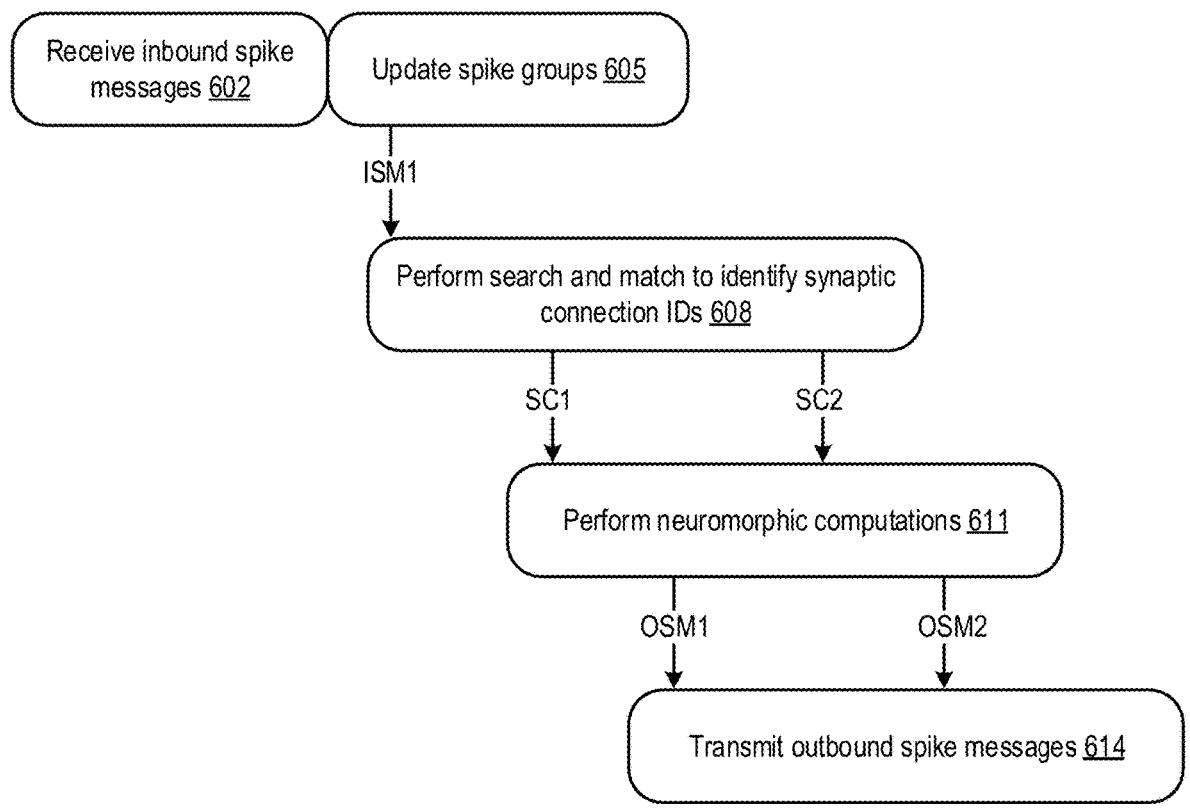
FIG. 6 is a block diagram illustrating parallel processing by a node within the SNN system according to some embodiments of the disclosure.

FIG. 6 is a block diagram illustrating parallel processing by a node within the SNN system according to some embodiments of the disclosure.

FIG. 6 shows operations of a node 100 arranged in a pipeline architecture to provide parallel processing of finding targeted synaptic connections 426 and performing the current integration calculations using the parameters of the targeted neuron. FIG. 6 shows the pipeline of operations moving from left to right within a particular time step (e.g., for the current bucket).

At item 602, node 100 receives inbound spike messages 304. A filter 112 may filter out spike messages that are not directed to node 100. Spike messages 602 are received via fabric from other interconnected nodes 100.

At item 605, the node 100 updates spike groups. For example, controller 109 may store the inbound spike messages 602 in corresponding buckets 502 based on the time delay 208 in the inbound spike messages 602 or in a current bucket 1 in a simple case. Inbound spike messages 602 indicating a smaller delay are cached in a bucket towards the current bucket as indicated by a circular bucket counter. A circular pointer incrementation may occur prior to caching the spike messages.

Next, each spike message stored in all buckets is processed using search and match operation. For example, FIG. 1 shows the processing of a first inbound spike message (labeled as "ISM1"). The ISM1 is a spike message contained in the current bucket based on the circular bucket counter corresponding to the current time step. There may be several other spike messages within the current bucket as well as other buckets; however, FIG. 6 shows processing a single inbound spike message 304. The ISM1 is generated from a source neuron (e.g., pre-synaptic neuron) having a source neuron ID 205. The source neuron may have synaptic connections with one or more target neurons 424 in the current bucket. The ISM1 should be targeted to each neuron 424 that is synaptically connected to the source neuron.

At item 608, node 100 performs a search and match to identify synaptic connection IDs 429. The search and match operation may be an in-memory operation to determine whether the memory is storing a source neuron identifier 433 that matches the source neuron identifier 205 of the ISM1. And if so, where in memory it is located. For example, the search and match operation may involve an in-memory pattern matching operation to determine whether the memory array 103 contains an input pattern (e.g., a bit sequence corresponding to the source neuron identifier 205). Thus, the search and match operation may involve comparing a bit pattern of a source neuron identifier contained in the spike message to several bit patterns stored in the memory to identify a synaptic connection. This can happen either in bit-serial, bit-parallel, or hybrid ways discussed above.

Upon locating a match, the synaptic connection ID 429 is determined. In some embodiments, a key-value pair is used to associate the source neuron identifier 433 to the synaptic connection ID 429. For example, if a matching neuron identifier 433 is located on a specific bit line(s) and word line(s), then bit line(s) and word line(s) mapped to a particular memory location containing the synaptic connection ID 429 for the synaptic connection. FIG. 6 shows the identification of a first synaptic connection 426 (labeled as "SC1"). In other words, the search and match operation performed on ISM1 yielded SC1. Neuromorphic computations for a single neuron may require yielding all synaptic connections SC1 for that neuron (i.e., identifying all synapses that receive spikes in the current time step). As noted above, the ISM1 may target multiple synaptic connections of multiple neurons.

In some embodiments, an array of source neuron identifiers 433*a-n* are stored in serial rows. For every row of serially stored source neuron identifiers 433*a-n*, a sense amp array produces a bitmask signifying which source neuron identifiers 433*a-n* have a match to any of source neuron identifier 205 of the ISM1 in the current bucket. During the search and match operation, every bit of all inbound spike messages in all buckets is matched and tested against a respective bit retrieved from the memory (relevant delay bucket that stores synaptic IDs), thereby producing intermediate bitmasks. Each bit of this bitmask is updated as subsequent bits for each of the source neuron identifiers 205 are being compared. In the end, after sequencing through the rows and comparing each bit from these rows with each relevant bit of each of the source neuron identifier 205, a bit in the bitmask may indicate a match. These bitmasks (1 bitmask per sense amplifier) may be stored in fast storage (e.g., Static RAM (SRAM) or fast Dynamic RAM (DRAM) array) proximate to each sense amplifier. The bitmasks can be used for optimization such that a single bit mismatch eliminates a potential match for subsequent bits of a source neuron identifiers 205 in the inbound spike message 304. In addition, multiple comparators and additional local fast storage may be added per sense amplifier to hold wider bitmasks. In some cases, with 3D memory topology groups of bits of the same synaptic ID can be distributed among multiple decks or die in a memory stack, hence allowing parallel comparison operation at each deck or die.

In some embodiments, the source neuron identifiers 433*a-n* are stored in non-volatile memory to support in-memory search and match operations. The search and match operation may be performed by activating a group of word lines that store the source neuron identifiers 433*a-n* in parallel and also activating a group of bit lines that store the source neuron identifiers 433*a-n* in parallel. Thus, the search and match operation can be fully overlapped with memory accesses using pipelining and multiplexing. Some memory access techniques with computation on bit line when applied to non-volatile memory allow to "pack" this step into fewer operations by performing parallel match on concurrently activated world lines and sensing bit lines.

Upon identifying SC1, the node 100 may perform neuromorphic computations. For example, at item 611, the node 100 performs neuromorphic computations. This may include performing synaptic current integration and membrane potential calculations, as well as synaptic plasticity computations including STDP and structural plasticity computations. These operations mathematically model synaptic plasticity. In some embodiments, the neuromorphic computation is fully overlapped with memory accesses using pipelining and multiplexing. Some memory access techniques with computation on bit line when applied to non-volatile memory allow to perform synapse change in-place in memory arrays 103. Overall neuromorphic computations 611 may be a relatively large computational operation that uses significant computing resources. As shown in FIG. 1, the neuromorphic computations (e.g., current integration, membrane potential calculation, etc.) is performed immediately upon identifying SC1. In addition, synaptic plasticity can be interleaved with current integration. Specifically, LTP based on synaptic events in previous time steps can be computed in the current time step upon detection a neuron fire in the previous time step. Detection of a neuron fire or spike is done after solving for the neuron model membrane equation, which is a differential equation based on the change in membrane potential over time and based on the calculated current resulting from performing a current integration. The current integration is based on a weight change based on past and future spikes relative to a post-synaptic spike. The weight of the neuron may be stored as a synaptic connection parameter with respect to a particular neuron 424.

The synaptic plasticity computations (e.g., STDP and structural plasticity computations) result in updated values of synaptic connection parameter 435. Specifically, this may involve calculating a new weight values of a synaptic connection. The synaptic plasticity computations involve STPD (LTD and LTP) equations utilizing pre- and post-synaptic spike timings and current state of each synapse.

Power efficiency may be optimized when accessing synaptic connection parameter 435 (e.g., weights). For example, a bitmask may be generated indicating the location of matching identifiers. However, such bitmasks may be sparse in the sense that only a few matches occur (e.g., 1% of all target identifiers). Each bitmask represents a unique neuron. Memory that uniquely accesses each cell in a column or a row may be used to access the synaptic connection parameter 435. Weights from each column or each row may be accessed at unique positions in a column or row. However, this is difficult in memory devices with shared WLs. Hence, all BLs are accessed per WL. The node may shunt or mask accessing some BLs to save power with some memory technologies while also utilizes sparse memory accesses with other computation.

As a result of various neuromorphic computations, the node 100 may generate an outbound spike message (labeled as "OSM1") OSM1 is generated at least in part by locating SC1 in a memory section and performing in memory calculations in a different memory section to generate OSM1 based on SC1 (OSM1 may or may not be generated in the current time step depending on the neuron state). While SC1 is identified and OSM1 is generated, the search and match operation may continue to occur in the memory section that stores synaptic connection data 421. For example, ISM1 may target multiple synaptic connections, each of which are searched for in the memory section that stores synaptic connection data 421. The pipeline architecture allows the identification of an additional synaptic connection (labeled as "SC2") while neuromorphic computations take place with respect to SC1. SC2 may involve a second targeted neuron 424 that is also spiked by ISM1. SC2 be used to generate a second outbound spike message (labeled as "OSM2"). Thus, the operations shown in item 608 occur in parallel (at least partially) with respect to the operations shown in item 611. The node's 100 memory architecture supports this parallel pipeline processing by storing synaptic connection data 421 in one memory section (for performing search and match operations) and storing synaptic connection parameters in different memory section to perform synaptic plasticity computations on matching neurons/synaptic connections and to generate outbound spike messages.

At item 614, the node 100 transmits outbound spike messages. For example, an output filter 115 may process output spike message and transmit them to other nodes 100 via fabric 132 and/or transmit them internally within the same node 100.

The following provides additional example of handling spike messages that are generated in respond to inbound spike messages. Upon detection of a generated spike message, the neuron ID that generated the spike message is reported to node 100 (e.g., a filter or router associated with the node). The node 100 prepares spike descriptors for all spiked neurons that generate outbound spike messages. The node 100 performs a broadcast or multicast operation so that the spike descriptors are transmitted throughout the SNN system. The output filter may also filter out the spikes that have local connections within the node and distribute them to the relevant delay buckets locally. Thus, the broadcast or multicast operation can start within a fraction of a clock cycle (in real time) for all memory arrays in the SNN network. Because the membrane potential may be computed in an SIMD manner for the entire memory array, the detection and production of post-synaptic spike messages are also performed in parallel for all neurons. Upon sending all spike messages to the SNN network, the node 100 can send a barrier message containing the number of spikes it generated so that recipient router could execute the barrier along with other barriers from other instances of this component. Such barrier message as well as all spike messages may also contain relevant identifiers of the neuron and/or node.

Some embodiments are directed to using a node 100 having a memory structure made up of multiple decks. Multiple decks may be leveraged to provide the parallelizing of the search and match operation with the neuromorphic computations (e.g., current integrations). In some embodiments, pre-synaptic ID bits may be spread among several memory arrays by means of multiplexing. This may greatly improve performance. For example, spreading IDs to 37 arrays (to track to the size of a human brain made up of 86 billion neurons) may result in 37-fold reduction in latency for the search and match operation. This may be referred to as a multiplexed configuration that achieves High-Performance Computing (HPC). Accumulation of synaptic current and weight with vertical integration may require a floating-point adder distributed among different decks or bonded die. This may eliminate the requirement of wide Input/Output. In general, a whole single instruction multiple data (SIMD) processor made up of floating point Fuse Multiply Accumulate (FMA) units could be distributed among decks, hence implementing compute-on-a-way paradigm.

The following embodiments describe the use of SIMD or MIMD processor for implementing SNN operations according to some of the disclosed embodiments. In some embodiments, the controller 109 may be implemented as a SIMD or MIMD processing devices and may perform the following methods.

Figure 7A:
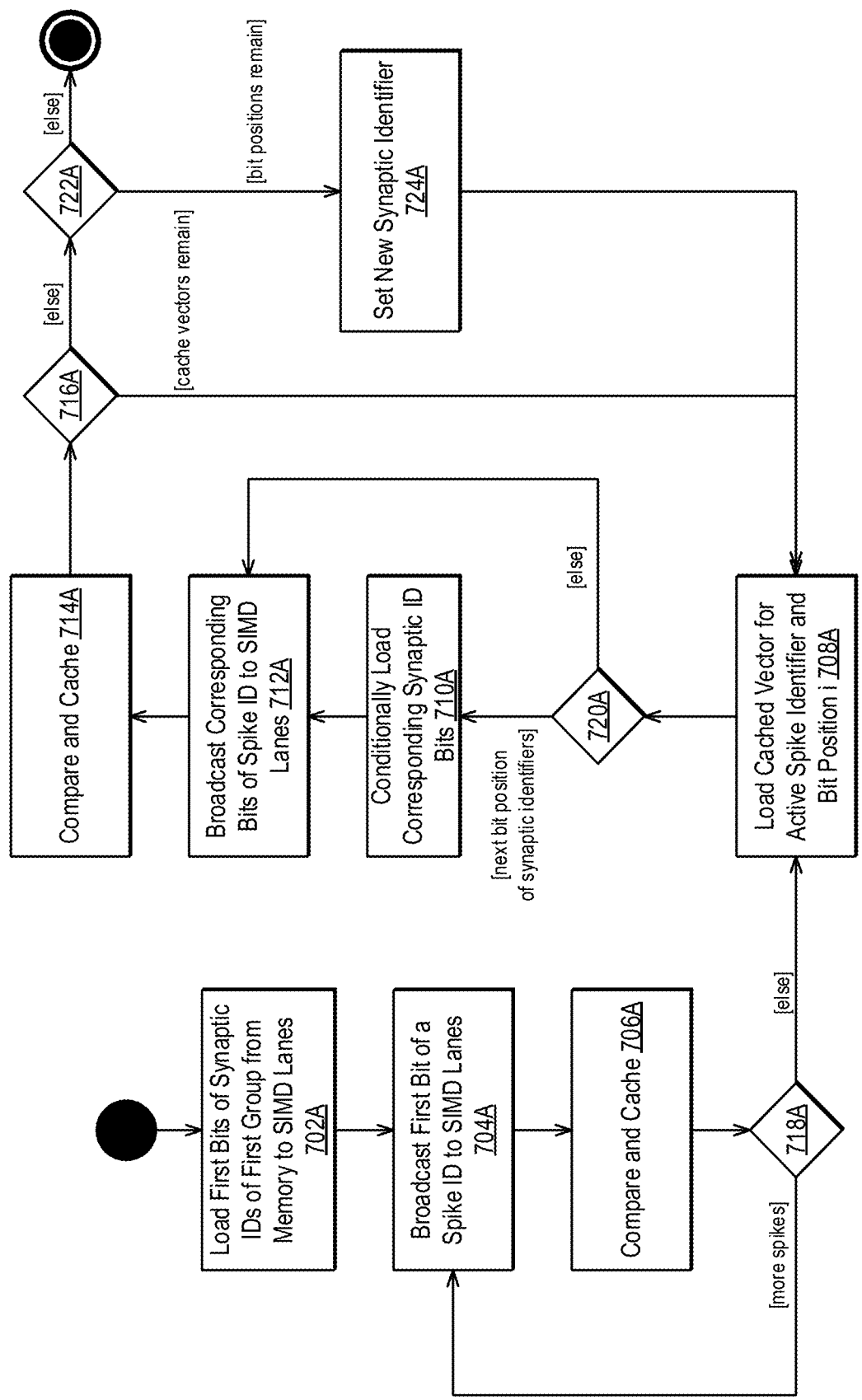
FIG. 7A is a flow diagram illustrating a method for performing spike delivery in a SIMD or MIMD pipeline according to some embodiments of the disclosure.

FIG. 7A is a flow diagram illustrating a method for performing spike delivery in a SIMD or MIMD pipeline according to some embodiments of the disclosure.

In block 702a, the method includes loading the first bits of synaptic IDs of a first delay group from memory into one or more SIMD lanes. In the illustrated embodiment, a delay group may correspond to a neuron bucket such as buckets 505a through 505n. That is, delay groups may be read from neuron buckets. In one embodiment, a given delay group of synaptic identifiers is represented as a sequence of vectors $SyID_g$, where g represents a given delay group identifier (e.g., from 0 to n). In the illustrated embodiment, the method first loads the first bits of each vector into a respective SIMD lane.

In one embodiment, synaptic IDs are stored in a two-dimensional array of memory cells. In such an embodiment, synaptic IDs for a given delay group may be represented as:

$$SyID = \begin{bmatrix} s_{1,1} & \cdots & s_{1,n} \\ \vdots & \ddots & \vdots \\ s_{L,1} & \cdots & s_{L,n} \end{bmatrix}$$

where s comprises a binary value, n represents the synaptic identifier length (in bits), and L represents the total number of synaptic identifiers in a given delay group. In one embodiment, each binary value s may correspond to the intersection of a row and column lines of a memory device. Individual bits are alternatively referenced using the matrix index notation SyID[g, k][n], where g represents a delay group identifier, k represents a synaptic identifier index (e.g., a row of SyID), and n represents a bit position. Thus, s1,1 of delay group 1 may be equally represented as SyID[1, 1][1]. In some examples, a delay group identifier is omitted for brevity.

Figure 7B:
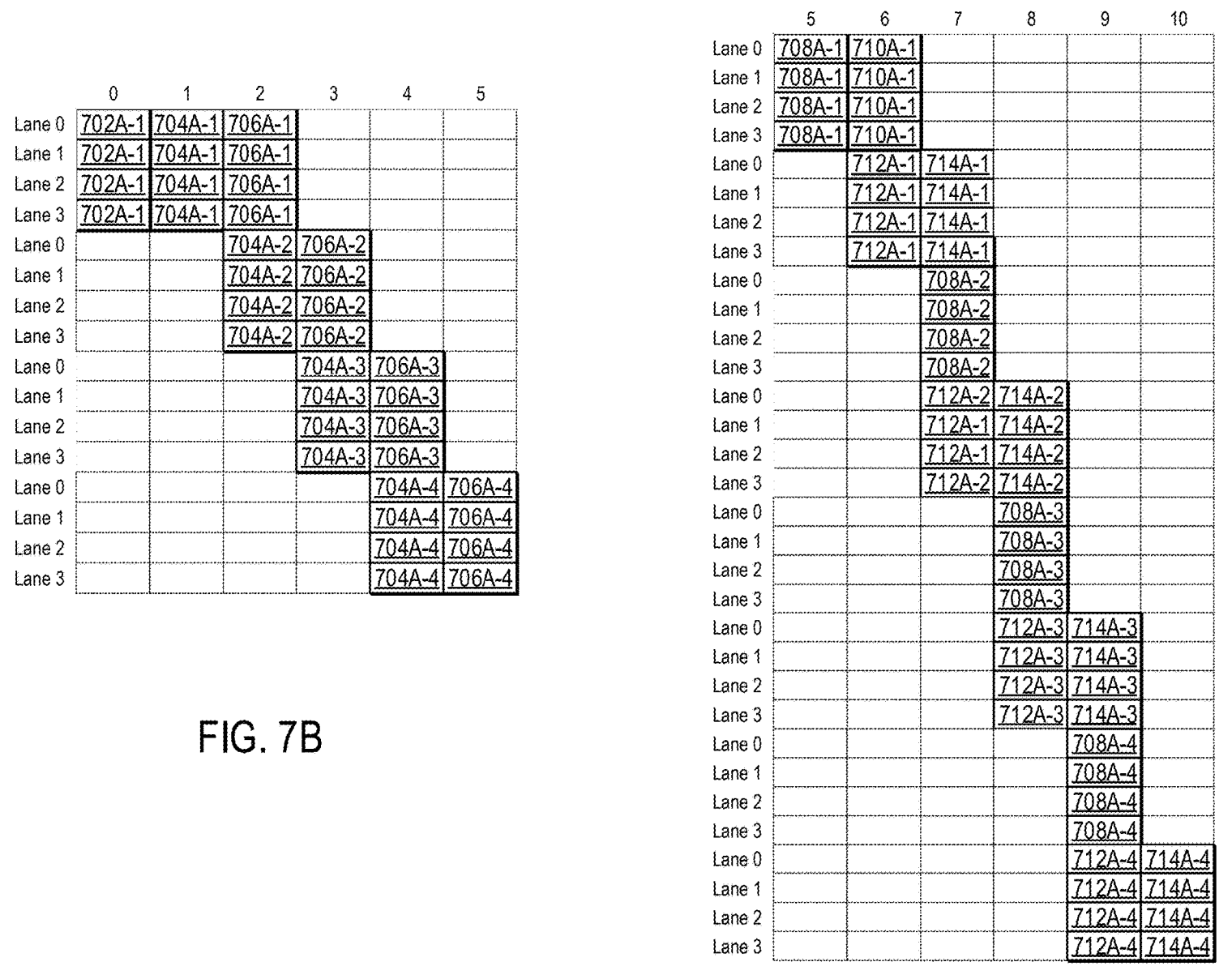

The pipeline in timing block diagram in FIG. 7B illustrates sequence of operations in a four-lane SIMD pipeline and presumes a synaptic ID vector length of four. Each block of the diagram is a single operation and some operations can be re-ordered in steps relative to each other as long as they do not depend on each other. The specific lane and vector sizes are not limiting. As illustrated, in such an embodiment at first operation described by step or block 702*a*, lane 0 is loaded with SyID[1, 1][1] (i.e., s1,1 of delay group 1), lane 1 with SyID[1, 2][1] (i.e., s2,1 of delay group 1), lane 2 with SyID[1, 3][1] (i.e., s3, 1 of delay group 1), and lane 3 with SyID[1, 4] [1] (i.e., s4,1 of delay group 1) (702*a*–1). In other words, the method loads the first column of the SyID matrix into SIMD pipeline.

In the illustrated embodiment, the bits loaded at a block 702*a* of timing block diagram are loaded into bit-vector registers (referred to as V2) associated with each lane. Thus, the V2 registers of L SIMD lanes may contain the vector:

$$V2 = \begin{bmatrix} s_{1,1} \\ s_{2,1} \\ \cdots \\ s_{L,1} \end{bmatrix}$$

At the completion of block 702*a*, the registers V2[0 . . . L] corresponds to a serial bit string associated with a first bit (bit 1) of all the synaptic ID values in a given delay group. In other words, the register V2[0 . . . L] corresponds to the bit values at a first position for all synaptic IDs in the matrix.

In block 704*a*, the method comprises broadcasting the first bit of a spike identifier to SIMD lanes. In the illustrated embodiment, spike identifiers may be broadcast from spike buckets such as buckets 502*a* through 502*n* in the spike cache. In one embodiment, a given bucket of spike identifiers is represented as a matrix of vectors:

$$SpID = \begin{bmatrix} sp_{1,1} & \cdots & sp_{1,n} \\ \vdots & \ddots & \vdots \\ sp_{M,1} & \cdots & sp_{M,n} \end{bmatrix}$$

where sp comprises a binary value, n represents the spike identifier length (in bits) which is equal to the length of both synaptic identifiers and spike identifiers, and M represents the total number of spike identifiers in a given delay group. In one embodiment, each binary value sp may correspond to the intersection of a row and column lines of a memory device or a cache device. Individual bits are alternatively referenced using the matrix index notation SpID[g, k][n], where g represents a delay group identifier, k represents a spike identifier index (e.g., a row of SpID), and n represents a bit position. Thus, s1,1 of spike delay group 1 may be equally represented as SpID[1, 1][1]. In some examples, a delay group identifier is omitted for brevity.

In block 704*a*, the first bit of a first spike identifier is broadcast to a register (V3) associated with each SIMD lane. Thus, at the end of block 704, V3 registers of L SIMD lanes may contain the vector:

$$V3 = \begin{bmatrix} sp_{1,1} \\ sp_{1,1} \\ \cdots \\ sp_{1,1} \end{bmatrix}$$

As can be seen, the vector V3 includes the same bit value for each SIMD lane L.

In the example embodiment of FIG. 7B, in block 704*a*, each SIMD lane is loaded with the bit value of SpID[1,1][1].

In the illustrated embodiment, the bits loaded in block 704*a* are loaded into a bit-vector register (V3) where each bit is associated with corresponding SIMD lane. Thus, each lane (1 to L) is associated with a single bit of bit-vector register (V3) at corresponding position. At the completion of block 704*a*, the register V3 corresponds to a serial bit string associated with a given position of a spike ID value (e.g., position 1). It should be noted that blocks 702*a* and 704*a* can be done in parallel or in different order relative to each other due to the fact that these steps do not depend on each other (i.e. one operation does not feed data to another operation in order to start it).

In block 706*a*, the method compares the synaptic ID bits and spike ID bits and caches the result. At the completion of blocks 702*a* and 704*a*, each SIMD lane includes a bit from a synaptic ID (register V2) and all SIMD lanes or a subset of them include or contain the same bit from a spike ID (register V3). In the illustrated embodiment, block 706*a* compares these registers and cache the result of the comparison in a cache location $C_n$, where n corresponds to the spike ID being compared (i.e., 1).

In one embodiment, the method compares the synaptic and spike IDs using an exclusive NOR (XNOR) operation. Thus, the result stored in $C_n$ is equal to $V2_n \odot V3_n$. The value of n is equal to the vector length of the system and, in particular, the number of SIMD lanes.

Returning to FIG. 7B, during stages 0 through 2, the method computes $C_1$, where $C_1$ comprises the XNOR comparison of all bits of V2 and V3. Thus, the cache value of $C_1$ is equal to $$C_1 = V2 \odot V3 = \begin{bmatrix} s_{1,1} \oplus sp_{1,1} \\ s_{2,1} \oplus sp_{1,1} \\ \cdots \\ s_{L,1} \oplus sp_{1,1} \end{bmatrix}$$

where each XNOR operation is performed by a corresponding SIMD lane L.

In block 718*a* of FIG. 7A, the method determines if all spike identifiers in a given group have been processed. If not, the method continues to execute blocks 704*a*, and 706*a* until all first bits of spike identifiers in a given group have been processed.

Specifically, in the illustrated embodiment, the output of block 718*a* comprises a set of cached vectors $C_1 \ldots C_M$, where M corresponds to the number of spike identifiers. Thus, each cached vector C is associated with a spike identifier (0 to M).

Thus, the method executes blocks 704*a*, and 706*a* for each first bit of each spike vector in a given delay group. More generally, the method computes a bit-vector of size $M_i$:

$$C_i = \begin{bmatrix} s_{1,1} \odot sp_{i,1} \\ s_{2,1} \odot sp_{i,1} \\ \ldots \\ s_{L,1} \odot sp_{i,1} \end{bmatrix}$$

where i is incremented from 1 to M during the processing. Thus, in FIG. 7B, blocks 704*a*–1/706*a*–1 correspond to i=1 (first bit of the first spike ID), 704*a*–2/706*a*–2 correspond to i=2 (first bit of the second spike ID), 704*a*–3/706*a*–3 correspond to i=3 (first bit of the third spike ID), and 704*a*–4/706*a*–4 correspond to i=4 (first bit of the forth spike ID), etc.

When the method reaches i=M, the method has generated M cache vectors having the form above. The method then proceeds to block 708*a*.

In some embodiments, the pipeline above can be further parallelized by introducing more comparator units and therefore comparing first bits from several spike IDs at a time.

In blocks 708*a* through 716*a*, the method executes a loop to iterate through all remaining bits (2 . . . n) for each of the remaining spike identifiers and compare them to relevant synaptic identifiers and cache the comparison result at relevant cached bit vector.

In block 708*a*, the method loads a cached bit vector that stores previous comparison results for a certain spike identifier. In one embodiment, the method loads bit-vector from a cache location $C_i$ into a bit-vector register V1 for L SIMD lanes of a first SIMD. In the illustrated embodiment, the method performs block 708*a* for each spike identifier. In one embodiment, the method may use the register V1 as an enabling bitmask for SIMD lanes for subsequent operations. In the illustrated embodiment, the method begins in block 708*a* by loading the value of $C_1$ (comparison results for the first spike identifier) from memory.

In block 720*a*, the method determines if next bits from synaptic identifiers should be loaded. As will be discussed, in one embodiment, the method will load bit vector $C_j[1]$ (where 1<ι<L) for the j-th spike identifier. Then, after processing all spike identifiers for the current bit position i, in block 716*a*, the method will update the bit position i (e.g., from 1 up to n) to the next bit position i+1. When the method updates the bit position in block 716*a*, it signals that the bits from the next bit position i+1 of synaptic identifiers should be loaded in block 710*a*, and sequencing repeats for all $C_j[1]$ again.

In block 710*a*, the method conditionally loads the corresponding bits of synaptic identifiers into register V2 based on current comparison results. In one embodiment, the method loads current comparison results for j-th spike ID in a form of bit vector $C_j[1]$ in block 708*a* (where 1 corresponds to lane number and represent a current comparison results for a certain synaptic ID in a form of a bit) and then loads values of SyID[1,ι][i] if corresponding bit in $C_j[1]$ is set (where ι is a lane number between 1 and L). In other words, the method loads the vector:

$$V2_i = \begin{bmatrix} s_{1,i} \\ s_{2,i} \\ \ldots \\ s_{L,i} \end{bmatrix}$$

That is, the i-th bit position of each synaptic ID. By loading this bit position in each SIMD lane, the method can process all synaptic IDs in parallel.

In one embodiment, the method only loads a corresponding synaptic ID bit if the corresponding V1 value is 1. Thus, if the vector stored in V1 is [0, 0, 0, 1], the method will only load the i-th bit position of the forth synaptic ID $s_{4, i+1}$, and not the bit positions from the first three synaptic IDs. Thus, the method will only selectively load a subset of i-th bit positions of L synaptic identifiers, where L is the number of SIMD lanes.

In block 712*a*, the method broadcasts a spike identifier bit position to a register V3. In the illustrated embodiment, the data broadcast in block 712*a* comprises the ith position of a single spike identifier. Thus, the vector V3 may be represented as:

$$V3_i = \begin{bmatrix} sp_{n,i} \\ sp_{n,i} \\ \ldots \\ sp_{n,i} \end{bmatrix}$$

where n represents the current analyzed spike identifier and i represents the current bit position (equivalent to the bit position in $V2_i$). In one embodiment, the method may only load values of a spike identifier when a corresponding value in $C_i$ is one.

In block 714*a*, the method compares and caches the values in V2 and V3. In one embodiment, the method computes the exclusive OR of V2 and V3 and updates the result in the cache vector received in block 708*a*. That is:

$$C_{i,j} = V2_i \odot V3_i$$

Thus, in block 714*a*, the method updates the vector $C_j$ representing current comparison results for j-th spike ID and all synaptice IDs based on the values loaded in V2 and V3. In some embodiments, the method may perform a different type of bit-wise comparison:

$$C_j[i] = C_j[i] \text{ AND } (V2_i \odot V3_i)$$

The above will always update to 0 if $C_j[i]$ was already 0, thus performing the same function as the conditional comparison mentioned above.

In block 716*a*, the method determines if all spike IDs and their corresponding cache vectors in a given group have been processed. If not, the method loads the next cache vector associated with a corresponding spike ID and re-executes blocks 708*a*, 710*a*, 712*a*, and 714*a* for each remaining spike ID and corresponding cache vector.

In some embodiments, blocks 708*a*, 710*a*, 712*a*, and 714*a* may be further parallelized by introducing more comparator units and therefore comparing first bits from several spike IDs at a time. In the illustrated embodiment, bit-vectors in cache locations $C_i$ are becomes sparser with every iteration (i.e., few binary 1 values due to narrowing the comparison results). Thus, in one embodiment, the method may compress these bit-vectors to improve performance.

Although illustrated sequentially, blocks 708a, 710a, 712a, and 714a may be pipelined to improve performance. As illustrated in FIG. 7B, in 708a-1 through 714a-1, the SIMD pipeline processes cache vector $C_1$, in 708a-2, 712a-2, 714a-2, the SIMD pipeline processes cache vector $C_2$, etc. In the illustrated embodiment, once the final cache vector $C_n$ is processed, the method may select a next bit position in the spike identifier and synaptic identifiers and repeat the pipelined method for each spike identifier.

As illustrated in FIG. 7B, in block 702A-1, a first SIMD processor loads first bits SyID[g,k][1] of L synaptic IDs SyID[g,k] of a first group (g=1) of a number of delay groups G from memory to first SIMD lanes 0 through 3 of a first SIMD into bit-vector register V2 where k signifies the first SIMD lane number. Thus, in blocks 702A-1, the first SIMD lanes perform the following operations:
Lane 0 SyID[1,0][1]=>V2[0]
Lane 1 SyID[1,1][1]=>V2[1]
Lane 2 SyID[1,2][1]=>V2[2]
Lane 3 SyID[1,3][1]=>V2[3]

Although only four lanes and bits are illustrated in the pipeline diagrams, the disclosure is not limited to four bits and indeed, any number of bits may be processed and lanes may be used.

Next, in blocks 704A-1 the first SIMD broadcasts the first bit of the first spike ID SpID[g,i] [1] (i=1 because it is the first spike ID) in a first group (g=1) of a number of delay groups G from memory to first SIMD lanes of first SIMD into bit-vector register V3. Thus, in blocks 704A-1, the first SIMD lanes perform the following operations:
Lane 0 SpID[1,1][1]=>V3[0]
Lane 1 SpID[1,1][1]=>V3[1]
Lane 2 SpID[1,1][1]=>V3[2]
Lane 3 SpID[1,1][1]=>V3[3]

Next, in blocks 706A-1 the first SIMD compares V2 and V3, and writes result to first cache location C1 (e.g. V2 XNOR V3=>C1). Thus, in blocks 706A-1, the SIMD lanes perform the following operations:
Lane 0 V2[0] XNOR V3[0]=>C1[0]
Lane 1 V2[1] XNOR V3[1]=>C1[1]
Lane 2 V2[2] XNOR V3[2]=>C1[2]
Lane 3 V2[3] XNOR V3[3]=>C1[3]

The above process repeats as illustrated in a pipelined fashion in steps 704A-2, 706A-2, 704A-3, 706A-3, 704A-4, 706A-4.

Specifically, in steps 704A-2 the first SIMD performs the operations:
Lane 0 SpID[1,2][1]=>V3[0]
Lane 1 SpID[1,2][1]=>V3[1]
Lane 2 SpID[1,2][1]=>V3[2]
Lane 3 SpID[1,2][1]=>V3[3]

In steps 706A-2, the first SIMD performs the operations:
Lane 0 V2[0] XNOR V3[0]=>C2[0]
Lane 1 V2[1] XNOR V3[1]=>C2[1]
Lane 2 V2[2] XNOR V3[2]=>C2[2]
Lane 3 V2[3] XNOR V3[3]=>C2[3]

In steps 704A-3, the first SIMD performs the operations:
Lane 0 SpID[1,3][1]=>V3[0]
Lane 1 SpID[1,3][1]=>V3[1]
Lane 2 SpID[1,3][1]=>V3[2]
Lane 3 SpID[1,3][1]=>V3[3]

In steps 706A-3, the first SIMD performs the operations:
Lane 0 V2[0] XNOR V3[0]=>C3[0]
Lane 1 V2[1] XNOR V3[1]=>C3[1]
Lane 2 V2[2] XNOR V3[2]=>C3[2]
Lane 3 V2[3] XNOR V3[3]=>C3[3]

The foregoing process continues until reaching the last spike ID. In steps 704A-4, the first SIMD broadcasts first bit of last spike ID SpID[g,i][1] (i=last because it is last spike ID) in a first group (g=1) of a number of delay groups G from memory to first SIMD lanes 0 through 3 of the first SIMD into bit-vector register V3. Thus, in steps 704A-4, the first SIMD performs the operations:
Lane 0 SpID[1, last][1]=>V3[0]
Lane 1 SpID[1, last][1]=>V3[1]
Lane 2 SpID[1, last][1]=>V3[2]
Lane 3 SpID[1, last][1]=>V3[3]

In steps 706A-4, the first SIMD compares V2 and V3, and write result to g1-th cache location Cg1 (e.g. V2 XNOR V3=>Cg1), where g1 stands for some number that corresponds to the number of spike IDs in a first group (g=1) of a number of delay groups G. Thus, the first SIMD performs the operations:
Lane 0 V2[0] XNOR V3[0]=>Cg1[0]
Lane 1 V2[1] XNOR V3[1]=>Cg1[1]
Lane 2 V2[2] XNOR V3[2]=>Cg1[2]
Lane 3 V2[3] XNOR V3[3]=>Cg1[3]

While executing steps 706A-4, the first SIMD can concurrently execute steps 708A-1, wherein the first SIMD loads a bit-vector from first cache location C1 into bit-vector register V1 for L SIMD lanes of a first SIMD. In step 708A-1, the first SIMD configures register V1 to be enabling bitmask for first SIMD lanes of the first SIMD for subsequent operations. Thus, the first SIMD performs the following operations:
Lane 0: C1[0]=>V1[0]
Lane 1: C1[1]=>V1[1]
Lane 2: C1[2]=>V1[2]
Lane 3: C1[3]=>V1[3]

Next, in steps 710A-1, the first SIMD loads second bits SyID[g,k][2] of L synaptic IDs SyID[g,k] of a first group (g=1) of a number of delay groups G from memory to first SIMD lanes of a first SIMD into bit-vector register V2 where k signifies the first SIMD lane number:
Lane 0: if V[0]==1: SyID[1,0][2]=>V2[0]
Lane 1: if V[1]==1: SyID[1,1][2]=>V2[1]
Lane 2: if V[2]==1: SyID[1,2][2]=>V2[2]
Lane 3: if V[3]==1: SyID[1,3][2]=>V2[3]

Concurrently with step 710A-1, the pipeline executes step 712A-1 wherein the first SIMD broadcasts a second bit of first spike ID SpID[g,i][2] (i=1 because it is first spike id) in a first group (g=1) of a number of delay groups G from memory to first SIMD lanes of first SIMD into bit-vector register V3:
Lane 0: if V[0]==1: SpID[1,1][2]=>V3[0]
Lane 1: if V[1]==1: SpID[1,1][2]=>V3[1]
Lane 2: if V[2]==1: SpID[1,1][2]=>V3[2]
Lane 3: if V[3]==1: SpID[1,1][2]=>V3[3]

Next, after step 712A-1, the first SIMD executes step 714A-1 wherein the first SIMD compares V2 and V3, and writes result to first cache location C1 (e.g. V2 XNOR V3=>C1):
Lane 0: if V[0]==1: V2[0] XNOR V3[0]=>C1[0]
Lane 1: if V[1]==1: V2[1] XNOR V3[1]=>C1[1]
Lane 2: if V[2]==1: V2[2] XNOR V3[2]=>C1[2]
Lane 3: if V[3]==1: V2[3] XNOR V3[3]=>C1[3]

As illustrated, the pipeline then executes steps 708, 712, and 714 iteratively as illustrated in steps 708A-2, 712A-2, 714A-2, 708A-3, 712A-3, 714A-3, 708A-4, 712A-4, and 714A-4.

In step 708A-2, the first SIMD executes:
Lane 0: C2[0]=>V1[0]
Lane 1: C2[1]=>V1[1]
Lane 2: C2[2]=>V1[2]
Lane 3: C2[3]=>V1[3]
In step 712A-2, the first SIMD executes:
Lane 0: SpID[1,2][2]=>V3[0]
Lane 1: SpID[1,2][2]=>V3[1]
Lane 2: SpID[1,2][2]=>V3[2]
Lane 3: SpID[1,2][2]=>V3[3]
In step 714A-2, the first SIMD executes:
Lane 0: if V[0]==1: V2[0] XNOR V3[0]=>C2[0]
Lane 1: if V[1]==1: V2[1] XNOR V3[1]=>C2[1]
Lane 2: if V[2]==1: V2[2] XNOR V3[2]=>C2[2]
Lane 3: if V[3]==1: V2[3] XNOR V3[3]=>C2[3]
In step 708A-3, the first SIMD executes:
Lane 0: C3[0]=>V1[0]
Lane 1: C3[1]=>V1[1]
Lane 2: C3[2]=>V1[2]
Lane 3: C3[3]=>V1[3]
In step 712A-3, the first SIMD executes:
Lane 0: SpID[1,2][2]=>V3[0]
Lane 1: SpID[1,2][2]=>V3[1]
Lane 2: SpID[1,2][2]=>V3[2]
Lane 3: SpID[1,2][2]=>V3[3]
In step 714A-3, the first SIMD executes:
Lane 0: if V[0]==1: V2[0] XNOR V3[0]=>C3[0]
Lane 1: if V[1]==1: V2[1] XNOR V3[1]=>C3[1]
Lane 2: if V[2]==1: V2[2] XNOR V3[2]=>C3[2]
Lane 3: if V[3]==1: V2[3] XNOR V3[3]=>C3[3]

Although not illustrated, the above sequence may continue for all spike IDs in a first group (g=1) of a number of delay groups G. In step 708A-4, the first SIMD loads a bit-vector from the g1-th cache location Cg1 into bit-vector register V1 for L SIMD lanes of a first SIMD and configures register V1 to be enabling bit-mask for first SIMD lanes of the first SIMD for subsequent operations; g1 stands for some number that corresponds to the number of spike IDs in a first group (g=1) of a number of delay groups G:
Lane 0: Cg1[0]=>V1[0]
Lane 1: Cg1[1]=>V1[1]
Lane 2: Cg1[2]=>V1[2]
Lane 3: Cg1[3]=>V1[3]
In step 712A-4, the first SIMD broadcasts a second bit of last spike ID SpID[g,i][2] (i=last because it is last spike id) in a first group (g=1) of a number of delay groups G from memory to first SIMD lanes of first SIMD into bit-vector register V3:
Lane 0: SpID[1, last][2]=>V3[0]
Lane 1: SpID[1, last][2]=>V3[1]
Lane 2: SpID[1, last][2]=>V3[2]
Lane 3: SpID[1, last][2]=>V3[3]
In step 714A-4, the first SIMD compares V2 and V3, and writes a result to g1-th cache location Cg1 (e.g. V2 XNOR V3=>Cg1), g1 stands for some number that corresponds to the number of spike IDs in a first group (g=1) of a number of delay groups G:
Lane 0: if V[0]==1: V2[0] XNOR V3[0]=>Cg1[0]
Lane 1: if V[1]==1: V2[1] XNOR V3[1]=>Cg1[1]
Lane 2: if V[2]==1: V2[2] XNOR V3[2]=>Cg1[2]
Lane 3: if V[3]==1: V2[3] XNOR V3[3]=>Cg1[3]

In a similar way as above the process continues with comparison of third bits of all spike IDs in the first group with third bits of L synaptic IDs which are also in the first group. The first group is one of a number of delay groups G. Just like before comparison has a condition that the result of comparisons of the prior bits (first and second bits) is true, which is recorded in the bit-vectors stored in cache locations Ci. Bit-vectors in cache locations $C_1$ are expected to be sparser and sparser with every iteration (not many 1s), so in some embodiments, an optimization would be compression of these bit-vectors.

Finally, the process continues with comparison of last bits of all spike IDs in the first group with last bits of L synaptic IDs which are also in the first group. The first group is one of a number of delay groups G. Just like before comparison has a condition that the result of comparisons of the prior bits is true, which is recorded in the bit-vectors stored in cache locations Ci. By the end of this step the cache locations Ci with bit-vectors with 1 will contain matches (which synaptic IDs and corresponding synapses received spikes in this time step in the first delay group). At the end of this operation or during this operation the bitmasks in the cache locations Ci can be merged (e.g., ORed) into a single bitmask that represents the enable bits for L synaptic IDs, i.e. which of the L synaptic IDs are being targeted.

Other delay groups can be compared in subsequent steps in this SIMD or they can be done in parallel in other SIMDs. Each group contains independent from other groups synaptic and spike IDs, therefore the steps are independent in each group and the same in each group. All delay groups need to undergo this process during each time step.

In some embodiments, the pipeline will retrieve bits of synaptic IDs from memory only once, which can provide an advantage because memory operations are latency expensive (tens of nanoseconds), especially considering the fact that there are many more synaptic IDs than spikes. Hence, spike IDs are located in cache or some other form of fast medium so that they can be retrieved quickly (a few ns) and compared quickly. Thus, in some embodiments, the pipeline can start reading subsequent bits of synaptic IDs while still performing comparison on previous bits.

In another embodiment, the pipeline may perform the comparison of first, second, . . . last bits of SyIDs with relevant bits of spike IDs in parallel, in separate SIMD or in sense amplifiers interfacing the SIMD. As a result of this the SIMDs are offloaded from performing these operations, which are done in memory/sense amps in this case, and the SIMD receives the spike bitmask, which is ready to be used further. Alternatively, primitive or simple SIMD operations can be built-in into each sense amp, hence allowing simple SIMD programming of each sense amp array.

For every delay group of synaptic IDs the sense amp array produces a bitmask signifying which synaptic IDs have a match to any of spike IDs in the spike delay bucket. Right after each bitmask is generated it can be immediately used for synaptic integration, which in one embodiment, is a summation of a charge injected into neuron's soma due to synapse making the cell membrane permeable. The charge leaks into a neuron in proportion to the synaptic efficacy/weight. This operation (adding charge or currents) can be done in parallel by the same SIMD processor if its compute capabilities allow to do that. The synaptic weight can be digital (e.g. 32 bit floats) or analog (at least one memory cell with stable analog value that does not change over time by itself.

In block 722a, the method determines if bit positions remain to be analyzed. As discussed, the method in blocks 708a, 710a, 712a, 714a, 716a, and 720a processes all cache vectors for all spike identifiers for a current bit position. In block 722*a*, once all cache vectors and spike identifiers have been processed, the method moves bit positions until all bit positions have been processed. Thus, returning to the pipeline in FIG. 7B, the pipeline method may be re-executed for each bit position.

At the end of the method, the cache locations $C_i$ with bit-vectors with logical 1s will contain matches (which synaptic IDs and corresponding synapses received spikes in a given time step in the first delay group). At the end of the method (or during the method), the bitmasks in the cache locations Ci can be merged (e.g., ORed) into a single bitmask (SyB) of length n that represents the enable bits for all L synaptic IDs, i.e., which of the L synaptic IDs are being targeted. In the illustrated embodiment, the bitmask SyB enables downstream pipeline stages to operate only on those synaptic IDs that are spiked by the incoming spike messages.

Other delay groups can be compared in subsequent steps in the SIMD core/processor executing the method, or they can be done in parallel in other SIMD cores/processors. In some embodiments, each group is independent of another group's synaptic and spike IDs. Therefore, the steps are independent in each group and the same in each group. In some embodiments, all delay groups are processed using the method during each time step.

As illustrated, the method only retrieves bits for each bit position of synaptic IDs from memory only once and compares them all at once in SIMD for corresponding bit positions of all spike IDs, which is an advantage as memory operations are latency expensive (generally requiring tens of nanosecond), especially considering the fact that there are generally more synaptic IDs than spikes. Hence, spike IDs may be located in a cache or some other form of a fast-access medium so that they can be retrieved quickly (e.g., in a few nanoseconds) and compared quickly. Thus, the method can start reading subsequent bits of synaptic IDs while still performing comparisons on previous bits.

In some embodiments, the method may perform the comparison of first, second, . . . , last bits of SyIDs with relevant bits of spike IDs in parallel, in separate SIMD, or in sense amplifiers interfacing with the SIMD. As a result of this, the SIMDs are offloaded from performing these operations, which are done in memory or sense amplifiers, and SIMD receives a result spike bitmask, which is ready to be used. Alternatively, SIMD operations can be built-in into each sense amplifier, hence allowing SIMD programming of each sense amp array.

For every delay group of synaptic IDs, the sense amplifier array can produce a bitmask signifying which synaptic IDs have a match to any of spike IDs in the spike delay bucket. Right after each bitmask is generated, it can be immediately used for synaptic integration, which (as one example) is a summation of a charge injected into a neuron's soma due to synapse making the cell membrane permeable. The charge leaks into a neuron in proportion to the synaptic efficacy and/or weight. This operation (adding charge or currents) can be done in parallel by the same SIMD processor. The synaptic weight can be digital (e.g., 32-byte floating point values) or analog (e.g., at least one memory cell with stable analog value that does not change over time by itself).

Figures 7C, 7D:
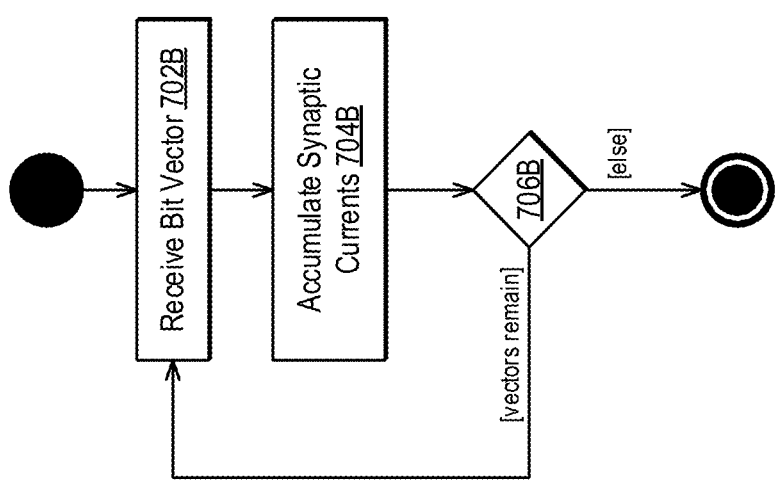
FIG. 7C is a flow diagram illustrating a method for performing synaptic integration in a SIMD or MIMD pipeline according to some embodiments of the disclosure.
FIG. 7D is a pipeline diagram illustrating a method for performing synaptic integration in a SIMD or MIMD pipeline according to some embodiments of the disclosure.

FIG. 7C is a flow diagram illustrating a method for performing synaptic integration in a SIMD or MIMD pipeline according to some embodiments of the disclosure. In the illustrated embodiment, the method of FIG. 7C may be executed by a second SIMD array while the method of FIG. 7A may be executed by a first SIMD array.

In block 702*b*, the method receives a bit vector representing the synaptic bitmask (SyB). In one embodiment, SyB comprises an n-dimensional bitmask vector, where n is the length of the synaptic identifier vectors.

In the illustrated embodiment, the bitmask SyB is generated as described in FIG. 7A and may correspond to the cached vectors $C_i$, where each set bit in such vector indicated if a sypanse that corresponds to the position of the bit received the spike in the current time step.

Thus, the bit vector received in block 702*b* is associated with L synaptic IDs SyID[g,k] of a first group (e.g., g=1) of a number of delay groups G. In the illustrated embodiment, the method loads the bit vector into register V1 for L SIMD lanes of a second SIMD. In some embodiments, the method can configure register V1 to be enabling bitmask for SIMD lanes of the second SIMD for subsequent operations.

In the illustrated embodiment, for every delay bucket of pre-synaptic IDs, the method produces a bitmask signifying which pre-synaptic IDs have a match to any of spike IDs in the spike delay bucket, i.e. which synaptic IDs receive spikes.

After the method of FIG. 7A generates each bitmask ($C_i$), the method of FIG. 7C can immediately use the bitmask for synaptic integration. As one example, the method can perform synaptic integration by computing a summation of a charge injected into a neuron's soma due to the synapse making the cell membrane permeable. The charge can leak into a neuron in proportion to the synaptic efficacy/weight. This operation (e.g., adding charge or currents) can be done in parallel by the same SIMD processor executing the method of FIG. 7A or by a different SIMD processor.

In block 704*b*, the method accumulates synaptic currents.

In the illustrated embodiment, the method accumulates the synaptic currents (i.e. conductances or weights, represented by vector SyW[g,k]) of a first group (g=1) of a number of delay groups G from memory to SIMD lanes of a second SIMD into vector register V2 where k signifies the SIMD lane number, and each lane number is associated with a specific neuron ID. In some embodiments, the synaptic currents may be scaled (e.g., multiplied) by a scaling vector $V_m$. In some embodiments, the vector $V_m$ may comprise a membrane potential of a given neuron.

The synaptic weight (SyW) can be digital (e.g., 32-bit floating-point values) or analog (e.g., memory cells with a stable analog value that does not change over time by itself). In the illustrated embodiment, the synaptic weights are allocated in a similar pattern as the pre-synaptic IDs, which makes their access suitable for SIMD operations predicated by the illustrated bitmasks. Thus, upon generating a bitmask for a delay bucket, the SIMD processor executing the method can start accessing relevant weights corresponding to all set bits in the bitmask and accumulating synaptic currents into designated registers for each neuron. The important observation here is that synaptic weights need to be aligned in memory columns per neuron so to make accumulation process easier.

The synaptic weight vectors can be allocated in a bit-serial manner (similar to the allocation of pre-synaptic IDs), a bit-parallel manner, or a rectangular manner. In the illustrated embodiment, since the bitmasks are generally sparse (e.g., only 5-10% of set bits in a bitmask), in some embodiments, the method may reduce an area requirement on a SIMD processor by having fewer FMA compute units. Thus, in some embodiments, a bit-parallel allocation may provide improved power benefits and reduce requirements on area, memory bandwidth. This is especially true if the array capabilities allow for shunting or masking off some sections of array per-memory row (e.g., as in an HRAM device). However, in some embodiments, a bit-parallel allocation would require a fixed mapping scheme from a bit-serially allocated array of IDs to a bit-parallel allocated array of weights per neuron. In other embodiments, shunt or predicated bit-serial allocation of synaptic weight vectors can also reduce power.

In the illustrated embodiment, the processing in block 704b can be represented as:

$$V2 = V2 + (V_m \times SyW)$$

where $V_m$ represents a scaling vector stored in a SIMD register and SyW represents the current synaptic weight, and V2 represents an output register.

In some embodiments, the method may only compute the above product when the bitmask for a given bit position is enabled. Thus, the above equation may be more formally represented as:

$$V2 = \begin{bmatrix} V2[1] + (V_m[1] \times SyW[g, k][1]), & \text{if } V1[1] = 1 \\ V2[2] + (V_m[2] \times SyW[g, k][2]), & \text{if } V1[2] = 1 \\ \ldots \\ V2[L] + (V_m[L] \times SyW[g, k][L]), & \text{if } V1[L] = 1 \end{bmatrix}$$

where V2[i] represents the current accumulated weight at bit position i, $V_m$[i] represents the scaling vector at bit position i, SyW[g,k][i] represents the current synaptic weight for synaptic identifier k in delay group g at bit position i, and V1[i] represents the bitmask at bit position i. In some cases the scaling could be avoided hence reducing this operation to addition.

Thus, each V2[k] will contain accumulated current for k-th neuron by the end of processing of all SyW per neuron. In one embodiment, the computation in block 704b may be performed using a complex-instruction set computer (CISC) architecture. Thus, the processing may comprise a single command having the form: if V[k]==1: Vm[1, k]×SyW[1,k]+=>V2[ k], which may be implemented as several reduced instruction set computer (RISC) microoperations represented by pseudocode:

```
load Vm[1,k]
load SyW[1,k] (in parallel with Vm or subsequently)
multiply Vm[1,k] × SyW[1,k]
add result of Vm[1,k] × SyW[1,k] to V2[k]
store additional result to V2[k]
```

In some embodiments, V2[k] can be initialized with 0 when starting the method with a given weight vector (SyW [1,k]) at the beginning of each time step (706b). Other embodiments may perform other calculations. For example, multiplication by $V_m$[1,k] could be avoided if SyW[1,k] represents synaptic charge/current.

In some embodiments, the method can restrict that each lane number is associated with a specific neuron ID. In some embodiments, this can be relaxed such that several lanes can be associated with a specific neuron ID. In this embodiment, each lane will create a sub-accumulation of currents and at the end of processing all synaptic weights these sub-accumulated results are summed into a single result per neuron.

In some embodiments, the order in which bit vectors are received is not specified, as long as each bit vector is associated with a specific set of weights, which can be stored in an aligned manner in a memory row. This is due to the result representing a summation of all currents, and thus the order of this summation within each slime step is not critical. Thus, the method enables out-of-order operations. Although the foregoing embodiments receive data from the first SIMD processor, if different SIMD processors are performing the method of FIG. 7A for different groups, then the method can receive data from more than one SIMD processor.

FIG. 7D is a pipeline timing diagram illustrating a method for performing synaptic integration in a SIMD or MIMD pipeline according to some embodiments of the disclosure. As illustrated in FIG. 7D, the method of FIG. 7C can be executed in a pipelined fashion. As illustrated, the method executes blocks 702B-1 and 704B-1 for a first bit vector, blocks 702B-2 and 704B-2 for a second bit vector, etc.

In step 702B-2, the second SIMD receives, from the first SIMD in FIG. 7B, a first bit-vector SyB[g,k] associated with L synaptic IDs SyID[g,k] of a first group (g=1) of a number of delay groups G, and loads this bit-vector into bit-vector register V1 for L SIMD lanes of a second SIMD. The pipeline configures register V1 to be enabling bit-mask for SIMD lanes of the second SIMD for subsequent operations:
Lane 0: SyB[1,0]=>V1[0]
Lane 1: SyB[1,1]=>V1[1]
Lane 2: SyB[1,2]=>V1[2]
Lane 3: SyB[1,3]=>V1[3]

In step 704B-1, the second SIMD accumulates L synaptic currents i.e. conductances or weights SyW[g,k] scaled by Vm[k] of a first group (g=1) of a number of delay groups G from memory to SIMD lanes of a second SIMD into vector register V2 where k signifies the SIMD lane number, and each lane number is associated with a specific neuron ID:
Lane 0: if V[0]==1: Vm[0]×SyW[1,0]+=>V2[0]
Lane 1: if V[1]==1: Vm[1]×SyW[1,1]+=>V2[1]
Lane 2: if V[2]==1: Vm[2]×SyW[1,2]+=>V2[2]
Lane 3: if V[3]==1: Vm[3]×SyW[1,3]+=>V2[3]

Next in step 702B-2, the second SIMD receives, from a first SIMD, a second bit-vector SyB[g,L+k] associated with L synaptic IDs SyID[g,L+k] of a first group (g=1) of a number of delay groups G, and SIMD-load this bit-vector into bit-vector register V1 for L SIMD lanes of a second SIMD and configures register V1 to be enabling bit-mask for SIMD lanes of the second SIMD for subsequent operations:
Lane 0: SyB[1, L+0]=>V1[0]
Lane 1: SyB[1, L+1]=>V1[1]
Lane 2: SyB[1, L+2]=>V1[2]
Lane 3: SyB[1, L+3]=>V1[3]

Next, in step 704B-2, the second SIMD accumulates L synaptic currents i.e. conductances or weights SyW[g,L+k] scaled by Vm[k] of a first group (g=1) of a number of delay groups G from memory to SIMD lanes of a second SIMD into vector register V2 where k signifies the SIMD lane number, and each lane number is associated with a specific neuron ID. In the illustrated embodiment, Vm[k] remains the same because it is per neuron but not per synapse:
Lane 0: if V[0]==1: Vm[0]×SyW[1, L+0]+=>V2[0]
Lane 1: if V[1]==1: Vm[1]×SyW[1, L+1]+=>V2[1]
Lane 2: if V[2]==1: Vm[2]×SyW[1, L+2]+=>V2[2]
Lane 3: if V[3]==1: Vm[3]×SyW[1, L+3]+=>V2[3]

The above steps 702 and 704 may continue for other synaptic IDs SyID[g,k] of a first group (g=1) of a number of delay groups G in batches or increments of L IDs until all bit-vectors SyB [g,k] for all IDs in a first group are received. Further, the process may continue for other delay groups G.

Ultimately, in step 702B-4, the second SIMD receives from a first SIMD a last bit-vector SyB[g, last L+k] associated with last L synaptic IDs SyID[g, last L+k] of a last group (g=last) of a number of delay groups G, and SIMD-load this bit-vector into bit-vector register V1 for L SIMD lanes of a second SIMD and configures register V1 to be enabling bit-mask for SIMD lanes of the second SIMD for subsequent operations:

Lane 0: SyB[last, last L+0]=>V1[0]
Lane 1: SyB[last, last L+1]=>V1[1]
Lane 2: SyB[last, last L+2]=>V1[2]
Lane 3: SyB[last, last L+3]=>V1[3]

Then in step 704B-4, the second SIMD accumulates the last L synaptic currents i.e. conductances or weights SyW[g, last L+k] scaled by Vm[k] of a last group (g=last) of a number of delay groups G from memory to SIMD lanes of a second SIMD into vector register V2 where k signifies the SIMD lane number, and each lane number is associated with a specific neuron ID. In one embodiment, Vm[k] remains the same because it is per neuron but not per synapse. In some embodiments, the entire operation is illustrated only for L neurons (i.e. all synaptic weights grouped by delay groups belong only to L neurons). In one embodiment, SIMD operations can also overlap memory waits with computation, thus it can process many batches of L neurons while waiting on data. So, in some embodiments, the pipeline can process another L neurons and start over and do the same process. Alternatively, another L neurons can be processed in a different SIMD concurrently. Thus, in step 704B-4, the second SIMD performs:

Lane 0: if V[0]==1: Vm[0]×SyW[last, last L+0]+=>V2[0]
Lane 1: if V[1]==1: Vm[1]×SyW[last, last L+1]+=>V2[1]
Lane 2: if V[2]==1: Vm[2]×SyW[last, last L+2]+=>V2[2]
Lane 3: if V[3]==1: Vm[3]×SyW[last, last L+3]+=>V2[3]

Further, in some embodiments, the method of FIG. 7C can be performed concurrently with the method of FIG. 7A/7B if, for example, another array (or a set of SIMD arrays) is available and operable concurrently with the array of pre-synaptic IDs. In some embodiments, co-allocation of weights with pre-synaptic identifiers bit-to-bit may be used, hence allowing to compute bitmasks and weight accumulation simultaneously and possibly with speculation and prediction.

In some embodiments, if a SIMD processor has multiplexed set of arrays of the same bit width as the bit addressing used then the method can speculatively start accessing all of them in the background (i.e. without the condition "if V[k]==1" as discussed previously) and concurrently with match operations of FIG. 7A. The method could then co-allocate the weights with pre-synaptic identifiers in bit-serial way, using a wider array. Alternatively, in some embodiments, the method could start accessing only relevant weights when bitmasks are available so saving on power (i.e. with the condition "if V[k]==1").

In some embodiments, the accumulation of synaptic current/weight with vertical integration can be implemented using a floating-point adder distributed among decks of a processing element or via a bonded die. In general, a whole SIMD processor of floating point FMAs could be distributed among decks, hence implementing compute-on-a-way paradigm.

As discussed previously, a bitmask is generally sparse (i.e., few binary ones). However, in the illustrated embodiments, each bitmask is unique per neuron. Thus, in some embodiments, a memory that could uniquely access each cell in a column or a row may be used. In this embodiment, the method accesses a few weights from each column or each row at unique positions in a column or row.

In memory devices that cannot uniquely access each cell (i.e., due to shared word lines), the method may access all bit lines per word line. In such a device, the method can shunt or mask some of the access operations to save on power.

Alternatively, or in conjunction with the foregoing, the method can utilize these sparse memory accesses with other computations, as discussed herein. After the search/match operation in FIG. 7A and the synaptic integration in FIG. 7C, the embodiments can proceed to solve a neuron model (i.e., membrane equation) as depicted in FIG. 7E.

Figure 7F:
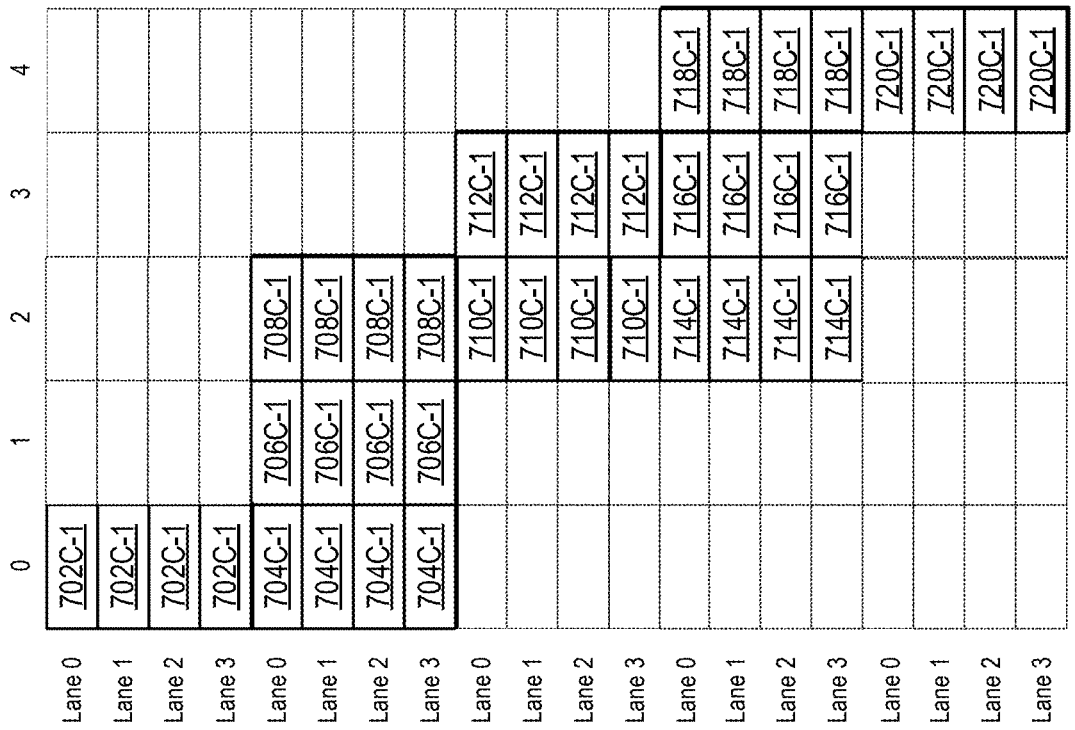
FIG. 7F is a pipeline diagram illustrating a method for performing neuronal dynamics in a SIMD or MIMD pipeline according to some embodiments of the disclosure.
Figure 7E:
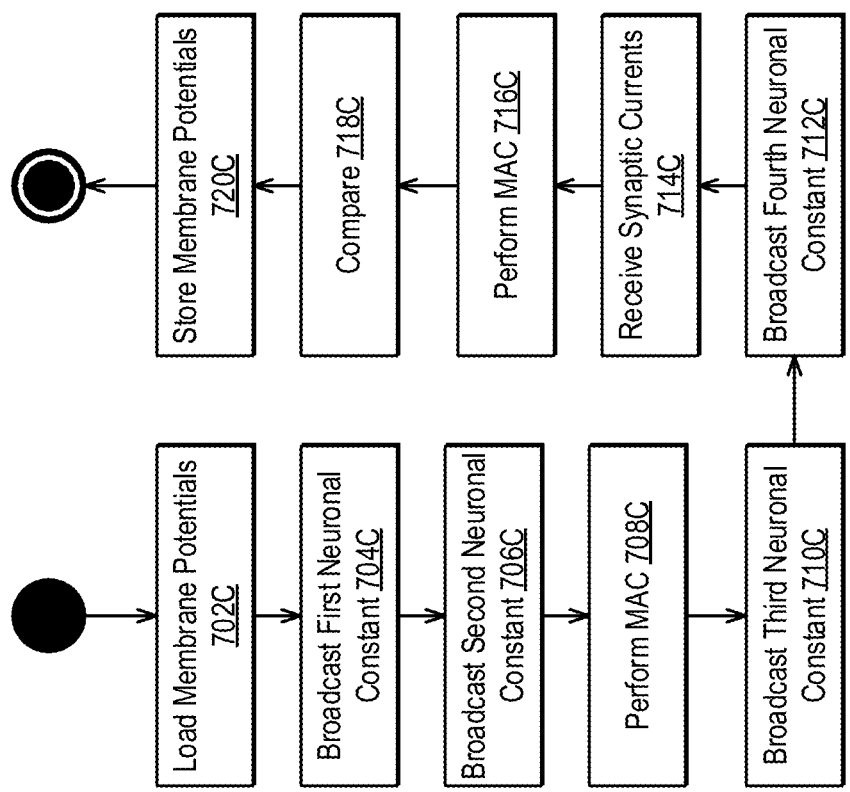
FIG. 7E is a flow diagram illustrating a method for performing neuronal dynamics in a SIMD or MIMD pipeline according to some embodiments of the disclosure.

FIG. 7E is a flow diagram illustrating a method for performing neuronal dynamics in a SIMD or MIMD pipeline according to some embodiments of the disclosure. FIG. 7F is a pipeline timing diagram illustrating a method for performing neuronal dynamics in a SIMD or MIMD pipeline according to some embodiments of the disclosure.

In the illustrated embodiment, after the search/match operation (FIG. 7A) and synaptic integration operation (FIG. 7C) the system can proceed to solve the neuron model (i.e., membrane equation). As one embodiment, FIG. 7E illustrates a leaky integrate-and-fire (LIF) neuron model, described by the following differential equation:

$$V_m(t) + \tau_m \frac{dV_m}{dt} = E_L + R_M I_E \quad \text{(Equation 1)}$$

This first-order, linear, and autonomous ordinary differential equation can be solved analytically, or by a numerical integration in a SIMD array, using a numerical form of Equation 1:

$$V_m(t + \Delta t) = V_m(t) + \frac{\Delta t(E_L - V_m(t) + R_m I_E(t))}{\tau_m} \quad \text{(Equation 2)}$$

In the illustrated embodiment, every processor in the SIMD array runs this numerical equation, as will be described below, for a corresponding neuron (e.g., each SIMD lane corresponds to and computes this equation for a single neuron). In the illustrated embodiment, Δt can be one millisecond and hence is equals to one and is global to the whole neural network). Other values of Δt may be used.

As discussed herein, the method performs two multiplications and three additions (subtraction can be replaced with the addition of a negative variable). In some embodiments, constant-related portions of the operation can be pre-computed. As a result, Equation 2 can be computed as follows. Since Δt is set at one (1), Equation 2 may be re-written as follows:

$$\begin{aligned} V_m(t+1) &= V_m(t) + \frac{E_L}{\tau_m} + \frac{V_m(t)}{\tau_m} + \frac{R_m I_e(t)}{\tau_m} \quad \text{Equation 3}\\ &= V_m(t) + E_{Lt} - V_m(t)\tau_{inv} + R_{mt}I_e(t)\\ &= V_m(t)(1 - \tau_{inv}) + E_{Lt} + I_e(t)R_{mt} \end{aligned}$$

where $E_L$ comprises the resting membrane potential, also known as the reversal potential of the leakage current, $V_m(t)$ represents the current membrane potential associated with a neuron associated with a given neuron identifier, $\tau_m$ comprises the membrane time constant, $R_m$ comprises the simulated membrane resistance of a given neuron, $R_{mt}=R_m/\tau_m$, $I_e(t)$ comprises the accumulated synaptic current computed using the method of FIG. 7C and available in the registers of SIMD array, $E_{Lt}=E_L/\tau_m$ and $\tau_m=1/\tau_m$.

In the illustrated embodiment, the method may precompute the constant portions of Equation 3. Specifically, the method may precompute, at an initial time step (e.g., 702c), the values of $E_{Lt}$, $R_{mt}$, and $\tau_{inv}$. Further, in some embodiments, the method may also precompute the value of $(1-\tau_{inv})$. Further, the values $(1-\tau_{inv})$, $E_{Lt}$, and $R_{mt}$ may be used across all executions of the method.

In block 702c, the method loads a membrane potential vector ($V_m(t)$). In one embodiment, the membrane potential vector ($V_m(t)$) is loaded from a memory device. That is, the membrane potential vector ($V_m(t)$) is represented as data in a given memory location of the memory device.

In block 704c, the method broadcasts a first neuronal constant $(1-\tau_{inv})$ and in block 706c, the method broadcasts a second neuronal constant ($E_{Lt}$).

In block 708c, the method performs a first multiply-accumulate (MAC) operation. In one embodiment, the method computes the $V_m(t)\times(1\tau_{inv}))+E_{Lt}$ and writes the result to register V1.

In block 710c, the method broadcasts a third neuronal constant ($R_{mt}$) and in block 712c, the method broadcasts a fourth neuronal constant ($V_{mt}$). In one embodiment, the fourth neuronal constant ($V_{mt}$) comprises a constant threshold value that triggers a reset in which a delta function spike occurs and the voltage is reset to its resting potential.

In block 714c, the method retrieves accumulated synaptic current ($I_E$) from vector registers of the SIMD processor. In one embodiment, the vector $I_E$ comprises a current from synaptic integration performed in FIG. 7C.

In block 716c, the method performs a second MAC operation. In one embodiment, the method computes the $(I_E\times R_{mt})+V_1$ and writes the result back to register V1.

As illustrated in FIG. 7E, blocks 702c, 704c, 706c, and 708c can overlap with blocks 710c and 712c. Further, blocks 714c and 716c can overlap. This is equation that we are using in SIMD timing diagram here. That is, the first MAC operation (e.g., 708c) can be computed during first two stages of processing because it does not have dependencies on other stages. For example, a second SIMD processor could perform this computation during idling time in stage 2 while waiting on bitmasks. Further, in some embodiments, $I_e(t)$ can be zero if a neuron does not receive any spikes during a time step. Hence, for such neurons $V_m(t+1)$ does not need to be modified once $V_m(t)(1-\tau_{inv})+E_{Lt}$ is computed.

In block 718c, the method performs a SIMD compare operation between $V_{mt}$ and $V_1$ (as computed in block 716c). In some embodiments, during or after solving for $V_m$ the SIMD processor can test $V_m$ for a spike (i.e., action potential), which is around 50 mV in biological neurons (compared to resting $V_m$ potential of, for example, minus 60 mV). In one embodiment, this detection is performed via a SIMD compare operation. In some embodiments, as part of block 716c, the method may transmit the result of the comparison to a spike router for insertion into a delay group. Specifically, the method computes a comparison vector by determining if each bit of $V_1$ is greater than the threshold $V_{mt}$.

In block 720c, the method stores the updated membrane potential ($V_1$) into memory for the corresponding neuron. Thus, in block 720c, the method replaces the previous value of $V_m(t)$ with the value computed and stored in $V_1$. In the illustrated embodiment, the method re-executes for each neuron/synaptic identifier. Further, the computation can be partially overlapped with memory accesses.

In FIG. 7F, the pipeline performs step 702C-1 wherein the second SIMD loads L membrane potentials Vm[k] from memory to SIMD lanes of a second SIMD into vector register V1 where k signifies the SIMD lane number, and each lane number is associated with a specific neuron ID. In some embodiments, Vm was already used in stage 2 by SIMD 2 so it is already loaded (this optimization can be used to save time and improve performance):

Lane 0: Vm[0]=>V1[0]
Lane 1: Vm[1]=>V1[1]
Lane 2: Vm[2]=>V1[2]
Lane 3: Vm[3]=>V1[3]

In step 704C-1, the second SIMD broadcasts a neuronal constant tau_m_inv_one_minus to L SIMD lanes of a second SIMD into vector register V3, such that each SIMD lane receives tau_m_inv_one_minus. As we see here this operation can be done concurrently with Vm loading. Broadcast can happen via a separate bus that runs from SIMD controller or scalar processor to each lane. This operation is much faster than loading from memory. In one alternative, the second SIMD can load L neuronal constants tau_m_inv_one_minus[k] from memory to SIMD lanes of a second SIMD into vector register V3 where k signifies the SIMD lane number, and each lane number is associated with a specific neuron ID. This operation is useful when neuronal constant tau_m_inv_one_minus is different to each neuron:

Lane 0: tau_m_inv_one_minus=>V3[0]
Lane 1: tau_m_inv_one_minus=>V3[1]
Lane 2: tau_m_inv_one_minus=>V3[2]
Lane 3: tau_m_inv_one_minus=>V3[3]

In step 706C-1, the second SIMD broadcasts neuronal constant Elt to L SIMD lanes of a second SIMD into vector register V4, such that each SIMD lane receives Elt. As illustrated, this operation can be done concurrently with Vm loading. In some embodiments, broadcast can happen via a separate bus that runs from SIMD controller or scalar processor to each lane. In some embodiments, this operation is much faster than loading from memory. Alternatively, the second SIMD can load L neuronal constants Elt[k] from memory to SIMD lanes of a second SIMD into vector register V4 where k signifies the SIMD lane number, and each lane number is associated with a specific neuron ID. This operation is useful when neuronal constant Elt is different to each neuron:

Lane 0: Elt=>V4[0]
Lane 1: Elt=>V4[1]
Lane 2: Elt=>V4[2]
Lane 3: Elt=>V4[3]

In step 708C-1, the SIMD multiply and accumulates vector registers: V1×V3+V4, and writes result to V1:

Lane 0: V1[0]×V3[0]+V4[0]=>V1[0]
Lane 1: V1[1]×V3[1]+V4[1]=>V1[1]
Lane 2: V1[2]×V3[2]+V4[2]=>V1[2]
Lane 3: V1[3]×V3[3]+V4[3]=>V1[3] In step 710C-1, the second SIMD broadcasts neuronal constant Rmt to L SIMD lanes of a second SIMD into vector register V5, such that each SIMD lane receives Rmt. Alternatively the second SIMD can load L neuronal constants Rmt[k] from memory to SIMD lanes of a second SIMD into vector register V5 where k signifies the SIMD lane number, and each lane number is associated with a specific neuron ID. This operation is useful when neuronal constant Rmt is different to each neuron:

Lane 0: Rmt=>V5[0]
Lane 1: Rmt=>V5[1]
Lane 2: Rmt=>V5[2]
Lane 3: Rmt=>V5[3]

In step 712C-1, the second SIMD broadcasts neuronal constant Vmt (Vm threshold potential) to L SIMD lanes of a second SIMD into vector register V4, such that each SIMD lane receives Vmt. Alternatively, the SIMD can load L neuronal constants Vmt[k] from memory to SIMD lanes of a second SIMD into vector register V4 where k signifies the SIMD lane number, and each lane number is associated with a specific neuron ID. This operation is useful when neuronal constant Vmt is different to each neuron:

Lane 0: Vmt=>V4[0]
Lane 1: Vmt=>V4[1]
Lane 2: Vmt=>V4[2]
Lane 3: Vmt=>V4[3]

In step 714C-1, the second SIMD receives accumulated synaptic currents Ie(t) [k] in vector register V2 associated with L neurons, where k signifies the SIMD lane number, and each lane number is associated with a specific neuron ID. In some embodiments, Ie(t)[k] can be received from another SIMD or it can be computed by this SIMD during the pipelining of FIG. 7D and stored in V2:

Lane 0: Ie(t)[0]=>V2[0]
Lane 1: Ie(t)[1]=>V2[1]
Lane 2: Ie(t)[2]=>V2[2]
Lane 3: Ie(t)[3]=>V2[3]

In step 716C-1, the second SIMD multiply-accumulates vector registers: V2×V5+V1, and writes the result to V1:

Lane 0: V2[0]×V5[0]+V1[0]=>V1[0]
Lane 1: V2[1]×V5[1]+V1[1]=>V1[1]
Lane 2: V2[2]×V5[2]+V1[2]=>V1[2]
Lane 3: V2[3]×V5[3]+V1[3]=>V1[3]

In this operation the second SIMD updated Vm based on received synaptic current Ie(t). If current is 0 (neurons did not receive any spikes) then this operation can be masked or still be correct if computed because it is 0 update. In some embodiments, the entire operation is done here only for L neurons (i.e. all Vm updates belong only to L neurons). So to process another L neurons the second SIMD will start over and do the same process. The second SIMD can also overlap memory waits with computation, thus it can process many batches of L neurons while waiting on data. Alternatively another L neurons can be processed in a different SIMD concurrently. In some models synaptic current is continuous (the value of synaptic current for each neuron from the current step serves as an initial value of synaptic current in the next time step with some adjustment). In such cases additional computation step is needed to adjust the value of synaptic current and store it in memory for the time next step. In this case in the next step the initial value of synaptic current can be used.

In step 718C-1, the second SIMD compares V1 and V4, and write 1 if V1>V4 to bit-vector register Vb1 otherwise write 0. The bit-vector register Vb1 now holds post-synaptic spikes for the neurons that produced them, each bit in Vb1 corresponds to local neuron position (local neuron ID):

Lane 0: V1[0]>V4[0]=>Vb1[0]
Lane 1: V1[1]>V4[1]=>Vb1[1]
Lane 2: V1[2]>V4[2]=>Vb1[2]
Lane 3: V1[3]>V4[3]=>Vb1[3]

In some embodiments, after step 718C-1 (in pipeline stage 5, not illustrated), the second SIMD can broadcast a current time step TS_current into memory TS[k] for all neurons that spiked, where k signifies the SIMD lane number, and each lane number is associated with a specific neuron ID:

Lane 0: If Vb1[0]: TS_current=>TS[0]
Lane 1: If Vb1[1]: TS_current=>TS[1]
Lane 2: If Vb1[2]: TS_current=>TS[2]
Lane 3: If Vb1[3]: TS_current=>TS[3]

Finally, in step 720C-1, the second SIMD stores L membrane potentials Vm[k] from vector register V1 into memory where k signifies the SIMD lane number, and each lane number is associated with a specific neuron ID:

Lane 0: V1[0]=>Vm[0]
Lane 1: V1[1]=>Vm[1]
Lane 2: V1[2]=>Vm[2]
Lane 3: V1[3]=>Vm[3]

The use of a LIF model is exemplary. In some embodiments, the method may use different neuron models such as resonate-and-fire, Izhikevich, Hodgkin-Huxley, FitzHugh-Nagumo, Morris-Lecar, Hindmarsh-Rose, and other models. In other embodiments, the method may use different models for different neurons or even more complex numerical integration methods (e.g., Runge-Kutta, Parker-Sochacki) applied to solving these equations.

Although a digital method is disclosed, the neuron model can be implemented using analog values and/or state. For example, a population of leaky DRAM caps (e.g., a partial DRAM column) can be used to model $V_m$. Synaptic current can then be injected into that array of caps, and potential can be measured with a sense amplifier and tested for a spike. In some embodiments, SIMD array hardware can be designed to implement both versions, analog and digital, and to be configured to run either of them.

In the illustrated embodiment, upon detection of a spike, the spiked neuron ID is reported to the local filter/router, which prepares spike descriptors for all spiked neurons and participates in the spike broadcast operation, the spike descriptors are being broadcast to the whole network. The method may also filter the spikes that are local to this SNN block's connections and distributes them to the relevant delay buckets (or delay groups) locally. Thus, the broadcast operation can start within a fraction of the 1 millisecond cycle time for all memory arrays in the network. Because the $V_m$ equation is computed in a SIMD manner for the entire array, the detection and production of post-synaptic spikes are also done in parallel for all neurons. Upon sending all spikes to the network, the hardware can send a barrier message containing the number of spikes it generated so that all recipient routers could execute the barrier along with other barriers from other instances of this component. Such a barrier message, as well as all spike messages, may also contain a component ID.

Figure 8:
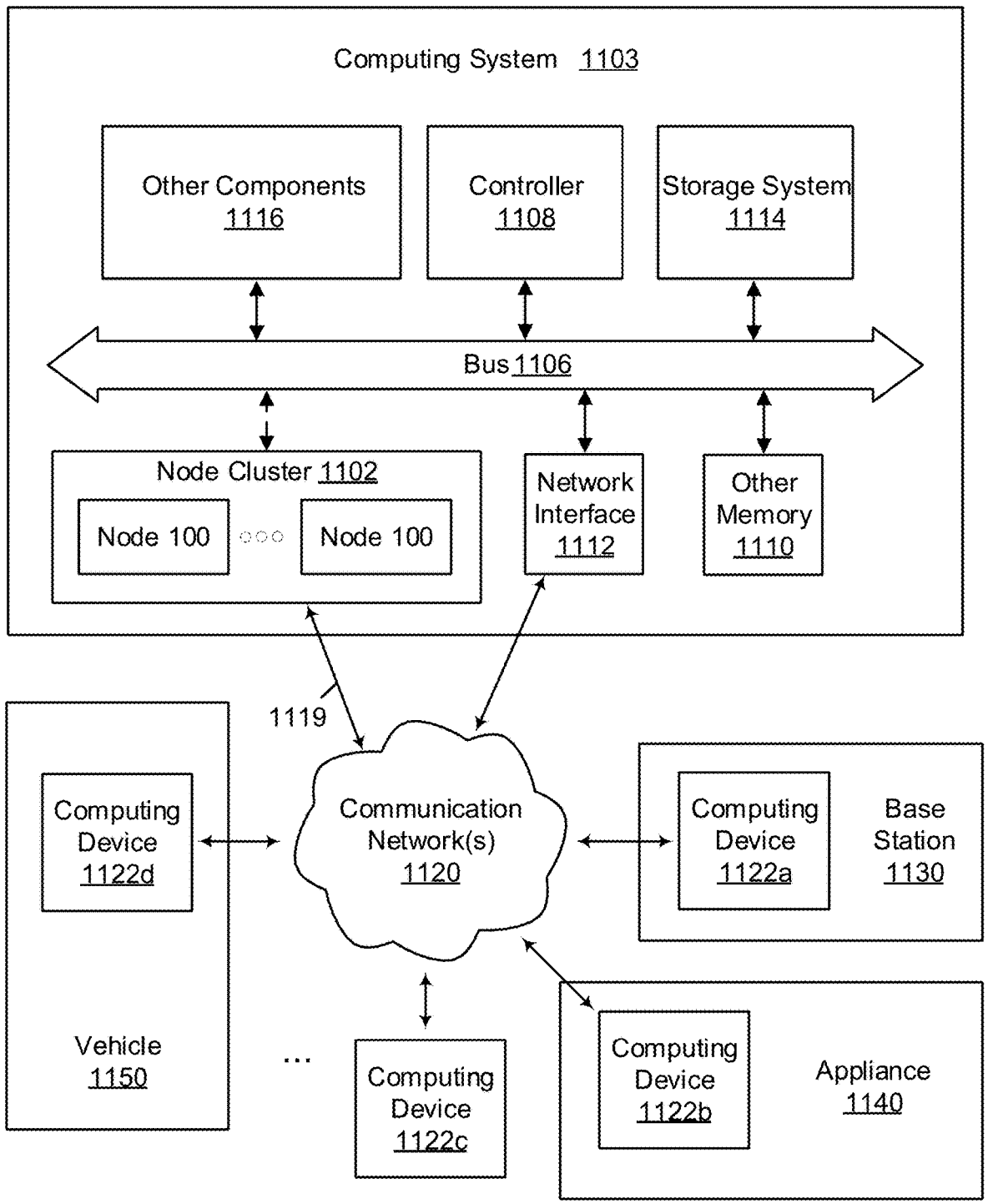
FIG. 8 illustrates an example of a networked system that includes the SNN system as a component according to various embodiments.

FIG. 8 illustrates an example networked system 1100 that includes a node cluster 1102 made up of a plurality of interconnected nodes 100, in accordance with some embodiments of the present disclosure. A node 100 may include a controller 109 and various memory sections that are integrated together into a single memory device. The single memory device may be fabricated on a single die or may be a multi-die stack. Each node 100 may interface with a plurality of other nodes in the node cluster 1102 to implement an SNN. The SNN is a computer-implemented, memory-based system that is modeled after a SNN to process information. The node cluster 1102 may be a cluster of nodes 100 within a router 800 or may be an array of routers 800, each of which contain one or more nodes 100.

FIG. 8 illustrates example parts of an example of a computing system 1103 which is part of the networked system 1100. FIG. 8 shows how a computing system 1103 can be integrated into various machines, apparatuses, and systems, such as IoT (Internet of Things) devices, mobile devices, communication network devices and apparatuses (e.g., see base station 1130), appliances (e.g., see appliance 1140), and vehicles (e.g., see vehicle 1150).

The computing system 1103 and computing devices of the networked system 1100 (e.g., see computing devices 1122*a*, 1122*b*, 1122*c*, and 1122*d*) can be communicatively coupled to one or more communication networks 1120. The computing system 1103 includes, for example, a bus 1106, a controller 1108 (e.g., a CPU), other memory 1110, a network interface 1112, a storage system 1114, other components 1116 (e.g., any type of components found in mobile or computing devices, GPS components, Input/Output (I/O) components such various types of user interface components, sensors, a camera, etc.), and the node cluster 1102 that implements an SNN. The other components 1116 may also include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., Graphics Processing Unit (GPU), Neural Processing Unit (NPU), neuro-processor), or any combination thereof. The bus 1106 communicatively couples the controller 1108, the other memory 1110, the network interface 1112, the data storage system 1114, and the other components 1116, and can couple such components to the node cluster 1102 in some embodiments. For example, fabric 132 may couple to the bus 1106.

The computing system 1103 includes a computer system having a controller 1108, other memory 1110 (e.g., random access memory (RAM), read-only memory (ROM), flash memory, dynamic random-access memory (DRAM) such as synchronous DRAM (SDRAM) or Rambus DRAM (RDRAM), static random-access memory (SRAM), crosspoint or cross-bar memory, crossbar memory, Flash NAND, or Flash NOR, etc.), the node cluster 1102, and data storage system 1114, which may communicate with each other via bus 1106 (which can include multiple buses).

To put it another way, FIG. 8 includes a block diagram of computing device 1122 that has a computer system in which embodiments of the present disclosure can operate. In some embodiments, the computer system can include a set of instructions, for causing a machine to perform at least part any one or more of the methodologies discussed herein, when executed. In such embodiments, the machine can be connected (e.g., networked via network interface 1112) to other machines in a Local Area Network (LAN), an intranet, an extranet, and/or the Internet (e.g., see communication network(s) 1120). The machine can operate in the capacity of a server or a client machine in client-server network environment, as a peer machine in a peer-to-peer (or distributed) network environment, or as a server or a client machine in a cloud computing infrastructure or environment.

Controller 1108 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 1108 can also be one or more special-purpose processing devices such as an ASIC, a programmable logic such as an FPGA, a digital signal processor (DSP), network processor, or the like. Controller 1108 is configured to execute instructions for performing the operations and steps discussed herein. Controller 1108 can further include a network interface device such as network interface 1112 to communicate over one or more communication networks (such as network(s) 1120).

The data storage system 1114 can include a machine-readable storage medium (also known as a computer-readable medium) on which is stored one or more sets of instructions or software embodying any one or more of the methodologies or functions described herein. The data storage system 1114 can have execution capabilities such as it can at least partly execute instructions residing in the data storage system. The instructions can also reside, completely or at least partially, within at least one of the other memory 1110 and the node cluster and/or within the controller 1108 during execution thereof by the computer system, at least one of the other memory 1110 and the node cluster 1102, as well as the controller 1108, also constituting machine-readable storage media. The other memory 1110 can be or include main memory or system memory of the computing device 1122.

As mentioned, the networked system 1100 includes computing devices, and each of the computing devices can include one or more buses, a controller, a memory, a network interface, a storage system, and other components. Also, each of the computing devices shown in FIG. 8 and described herein can include or be a part of a mobile device or the like, e.g., a smartphone, tablet computer, IoT device, smart television, smartwatch, glasses or other smart household appliance, in-vehicle information system, wearable smart device, game console, PC, digital camera, or any combination thereof. As shown, the computing devices can be connected to network(s) 1120 that includes at least a local network such as Bluetooth or the like, a wide area network (WAN), a local area network (LAN), an intranet, a mobile wireless network such as 4G or 5G, an extranet, the Internet, and/or any combination thereof. In some embodiments, as shown with the connection 1119, the node cluster 1102 can include at least one network interface so that it can communicate separately with other devices via communication network(s) 1120. For example, the fabric 132 may couple to the communication network 1120. In this respect, a memory module or a memory module system of the node cluster 1102 may have its own network interface so that such a component can communicate separately with other devices via communication network(s) 1120.

Each of the computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the computing system 1103 shown in FIG. 8, the term "machine" shall also be taken to include any collection of machines that individually or jointly execute a set (or multiple sets) of instructions to perform one or more of the methodologies or operations discussed herein. And, each of the illustrated computing devices as well as computing systems can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A device comprising:
a plurality of parallel processors, the plurality of parallel processors configured to:
perform a search and match operation, the search and match operation loading a plurality of synaptic identifier bit strings and a plurality of spike identifier bit strings, the search and match operation further generating a plurality of bitmasks and performing an exclusive NOR (XNOR) operation between first bits of a plurality of synaptic identifier vectors and a first bit of a first spike identifier and storing a result of the XNOR operation in a first location;
perform a synaptic integration phase, the synaptic integration phase generating a plurality of synaptic current vectors based on the plurality of bitmasks, the synaptic current vectors associated with respective synthetic neurons;
solve a neural membrane equation for each of the synthetic neurons;
update one or more state variables associated with the synthetic neurons; and
write a data values indicative of the one or more state variables to a memory device.

2. The device of claim 1, wherein the search and match operation comprises: selecting a plurality of additional spike identifiers and, for each additional spike identifier performing an XNOR operation between first bits of a plurality of synaptic identifier vectors and a first bit of an additional spike identifier; and storing the results of the XNOR operations in respective cache locations, a number of cache locations equal to a number of spike identifiers and the length of a cache location equal to the number of the synaptic identifier vectors.

3. The device of claim 2, wherein the search and match operation comprises:
loading remaining bits of the synaptic identifiers;
performing XNOR operations between the remaining bits of the synaptic identifiers and corresponding remaining bits of each of spike identifiers; and
storing the results of the XNOR operations in respective cache locations.

4. The device of claim 1, wherein performing a synaptic integration phase comprises disabling or enabling performing the synaptic integration phase based on the plurality of bitmasks.

5. The device of claim 1, wherein performing a synaptic integration phase comprises accumulating synaptic currents associated with each synthetic neuron based on a synaptic weight.

6. The device of claim 1, wherein solving a neural membrane equation comprises solving a leaky integrate and fire (LIF) model for each synthetic neuron.

7. The device of claim 1, wherein solving an LIF model for each synthetic neuron comprise pre-loading a plurality of neuronal constants.

8. The device of claim 7, wherein solving an LIF model for each synthetic neuron comprises performing a plurality of multiply and accumulate operations using the neuronal constants, a plurality of current membrane potential, and a plurality of synaptic current vectors.

9. The device of claim 7, wherein the parallel processors comprise single instruction multiple data (SIMD) or multiple instruction multiple data (MIMD) processors.

10. A method comprising:
performing, by a parallel processor, a search and match operation, the search and match operation loading a plurality of synaptic identifier bit strings and a plurality of spike identifier bit strings, the search and match operation further generating a plurality of bitmasks;
performing an exclusive NOR (XNOR) operation between first bits of a plurality of synaptic identifier vectors and a first bit of a first spike identifier;
storing a result of the XNOR operation in a first location;
performing, by the parallel processor, a synaptic integration phase, the synaptic integration phase generating a plurality of synaptic current vectors based on the plurality of bitmasks, the synaptic current vectors associated with respective synthetic neurons;
solving, by the parallel processor, a neural membrane equation for each of the synthetic neurons; and
updating, by the parallel processor, state variables associated with the synthetic neurons, the state variables stored in a memory device.

11. The method of claim 10, wherein performing a search and match operation comprises: selecting a plurality of additional spike identifiers and, for each additional spike identifier: performing an XNOR operation between first bits of a plurality of synaptic identifier vectors and a first bit of a additional spike identifier; and
storing the results of the XNOR operations in respective cache locations, a number of cache locations equal to a number of spike identifiers and the length of a cache location equal to the number of the synaptic identifier vectors.

12. The method of claim 11, further comprising loading remaining bits of the synaptic identifiers;
performing XNOR operations between the remaining bits of the synaptic identifiers and corresponding remaining bits of each spike identifier; and
storing the results of the XNOR operations in respective cache locations.

13. The method of claim 10, wherein performing a synaptic integration phase comprises disabling or enabling performing the synaptic integration phase based on the plurality of bitmasks.

14. The method of claim 10, wherein performing a synaptic integration phase comprises accumulating synaptic currents associated with each synthetic neuron based on a scaling vector and a current synaptic weight.

15. The method of claim 10, wherein solving a neural membrane equation comprises solving a leaky integrate and fire (LIF) model for each synthetic neuron.

16. The method of claim 10, wherein solving an LIF model for each synthetic neuron comprise pre-loading a plurality of neuronal constants.

17. The method of claim 16, wherein solving an LIF model for each synthetic neuron comprises performing a plurality of multiply and accumulate operations using the neuronal constants, a plurality of current membrane potential, and a plurality of synaptic current vectors.

18. A non-transitory computer readable storage medium for tangibly storing computer program instructions capable of being executed by a parallel processor, the computer program instructions defining steps of:
performing a search and match operation the search and match operation loading a plurality of synaptic identifier bit strings and a plurality of spike identifier bit strings, the search and match operation further generating a plurality of bitmasks;
performing an exclusive NOR (XNOR) operation between first bits of a plurality of synaptic identifier vectors and a first bit of a first spike identifier;
storing a result of the XNOR operation in a first location;
performing, by the parallel processor, a synaptic integration phase, the synaptic integration phase generating a plurality of synaptic current vectors based on the plurality of bitmasks, the synaptic current vectors associated with respective synthetic neurons;
solving, by the parallel processor, a neural membrane equation for each of the synthetic neurons; and
updating, by the parallel processor, state variables associated with the synthetic neurons, the state variables stored in a memory device.

* * * * *